(12) United States Patent
Dilling

(10) Patent No.: US 12,551,992 B2
(45) Date of Patent: Feb. 17, 2026

(54) FASTENER SYSTEM WITH STABILIZER RIBS AND SQUARE DRIVE

(71) Applicant: PHILLIPS SCREW COMPANY, Amesbury, MA (US)

(72) Inventor: Gary Dilling, Gardiner, MA (US)

(73) Assignee: PHILLIPS SCREW COMPANY, Amesbury, MA (US)

( * ) Notice: Subject to any disclaimer, the term of this patent is extended or adjusted under 35 U.S.C. 154(b) by 974 days.

(21) Appl. No.: 17/538,787

(22) Filed: Nov. 30, 2021

(65) Prior Publication Data

US 2022/0161398 A1 May 26, 2022

Related U.S. Application Data

(63) Continuation-in-part of application No. 17/206,367, filed on Mar. 19, 2021, now Pat. No. 12,384,007, which is a continuation of application No. 15/616,461, filed on Jun. 7, 2017, now Pat. No. 10,953,522.

(60) Provisional application No. 62/360,741, filed on Jul. 11, 2016.

(51) Int. Cl.
*B25B 21/00* (2006.01)
*B21K 1/46* (2006.01)
*B25B 15/00* (2006.01)
*F16B 23/00* (2006.01)

(52) U.S. Cl.
CPC ............ *B25B 15/005* (2013.01); *B21K 1/463* (2013.01); *F16B 23/0023* (2013.01); *B25B 21/00* (2013.01)

(58) Field of Classification Search
CPC ... B25B 15/005; B21K 1/463; F16B 23/0023; F16B 23/00; F16B 23/0061; F16B 23/0069; F16B 23/0076; F16B 23/0092; Y10S 411/919
USPC ........... 81/460, 436, 461; 411/402–404, 407, 411/410
See application file for complete search history.

(56) References Cited

U.S. PATENT DOCUMENTS

| | | | |
|---|---|---|---|
| 2,140,449 A | 12/1938 | Brown | |
| 2,173,707 A * | 9/1939 | Brown | F16B 23/0092 81/460 |
| 2,216,381 A * | 10/1940 | West | F16B 23/0023 81/460 |
| 2,248,695 A | 7/1941 | Bradshaw | |
| 2,349,458 A | 5/1944 | Owen et al. | |

(Continued)

FOREIGN PATENT DOCUMENTS

| CA | 329291 A | 1/1933 |
|---|---|---|
| CA | 2 128 391 A | 1/1996 |

(Continued)

OTHER PUBLICATIONS

International Search Report issued in related application PCT/US/36065, completed Aug. 1, 2017 and mailed Sep. 1, 2017.

(Continued)

*Primary Examiner* — Christine M Mills
*Assistant Examiner* — Dil K. Magar
(74) *Attorney, Agent, or Firm* — Merchant & Gould P.C.

(57) ABSTRACT

Fasteners, drivers, punches, fastener systems, and methods of making fasteners, drivers, punches, and fastener systems are disclosed herein. The fasteners, drivers, punches, and fastener systems include, in one example, stabilizing ribs and corresponding recesses.

13 Claims, 19 Drawing Sheets

(56) References Cited

U.S. PATENT DOCUMENTS

| | | | |
|---|---|---|---|
| 2,400,684 A * | | 5/1946 | Clark .................. F16B 23/0092 |
| | | | 411/404 |
| 2,474,994 A | | 7/1949 | Tomalis |
| 2,800,829 A | | 7/1957 | West |
| RE24,878 E | | 9/1960 | Smith et al. |
| 3,028,781 A | | 4/1962 | Muenchinger |
| 3,108,623 A | | 10/1963 | Muenchinger |
| 3,120,012 A | | 2/1964 | Muenchinger |
| 3,209,383 A | | 10/1965 | Carlson |
| 3,237,506 A | | 3/1966 | Muenchinger |
| 3,238,540 A | | 3/1966 | Muenchinger |
| 3,238,541 A | | 3/1966 | Muenchinger |
| 3,246,556 A | | 4/1966 | Phipard, Jr. |
| 3,357,295 A | | 12/1967 | Smith |
| 3,439,413 A | | 4/1969 | Stillwagon, Jr. |
| 3,584,667 A | | 6/1971 | Reiland |
| 3,763,725 A | | 10/1973 | Reiland |
| 4,084,478 A | | 4/1978 | Simmons |
| 4,089,357 A | | 5/1978 | Gill |
| 4,126,908 A | | 11/1978 | Gill |
| 4,187,892 A | | 2/1980 | Simmons |
| 4,202,244 A | | 5/1980 | Gutshall |
| D256,553 S | | 8/1980 | Fayle |
| 4,228,723 A | | 10/1980 | Cunningham |
| 4,258,596 A | | 3/1981 | Bisbing et al. |
| 4,269,246 A | | 5/1981 | Larson et al. |
| 4,355,552 A | | 10/1982 | Gutshall |
| 4,367,664 A * | | 1/1983 | Ekshtut .................. B25B 15/008 |
| | | | 81/439 |
| 4,457,654 A | | 7/1984 | Sygnator |
| 4,464,957 A | | 8/1984 | Gill |
| 4,527,932 A | | 7/1985 | Onasch et al. |
| 4,572,720 A | | 2/1986 | Rockenfeller et al. |
| 4,653,244 A | | 3/1987 | Farrell |
| 5,019,080 A | | 5/1991 | Hemer |
| 5,120,173 A | | 6/1992 | Grady |
| 5,203,742 A | | 4/1993 | Grady |
| 5,214,987 A * | | 6/1993 | Fenton, Sr. ........... B25B 15/005 |
| | | | 81/463 |
| 5,219,253 A | | 6/1993 | Shinjo |
| 5,239,253 A | | 8/1993 | Shimizu et al. |
| 5,279,190 A | | 1/1994 | Goss et al. |
| 5,358,368 A * | | 10/1994 | Conlan ................ F16B 23/0092 |
| | | | 411/410 |
| 5,364,212 A | | 11/1994 | Gill |
| 5,435,680 A | | 7/1995 | Schuster |
| 5,461,952 A | | 10/1995 | Goss |
| 5,509,334 A | | 4/1996 | Shinjo |
| 5,536,127 A | | 7/1996 | Pennig |
| 5,540,531 A | | 7/1996 | Choiniere |
| 5,544,993 A | | 8/1996 | Härle |
| 5,553,983 A | | 9/1996 | Shinjo |
| 5,554,983 A | | 9/1996 | Kitamura et al. |
| 5,562,547 A * | | 10/1996 | Borzone ............. F16B 23/0015 |
| | | | 411/407 |
| 5,641,258 A * | | 6/1997 | Sala ..................... F16B 23/003 |
| | | | 411/404 |
| 5,674,037 A * | | 10/1997 | Lu ....................... F16B 23/0092 |
| | | | 411/404 |
| 5,765,980 A * | | 6/1998 | Sudo .................. F16B 23/0076 |
| | | | 411/404 |
| 5,957,645 A | | 9/1999 | Stacy |
| 6,074,149 A | | 6/2000 | Habermehl et al. |
| 6,086,303 A | | 7/2000 | Flückiger |
| 6,158,310 A | | 12/2000 | Goss |
| 6,199,455 B1 | | 3/2001 | Wagner |
| 6,223,634 B1 * | | 5/2001 | Hughes ................ B25B 15/005 |
| | | | 411/404 |
| 6,234,914 B1 | | 5/2001 | Stacy |
| 6,341,546 B1 * | | 1/2002 | Totsu ................... F16B 23/0092 |
| | | | 411/404 |
| 6,367,358 B1 | | 4/2002 | Stacy |
| 6,402,449 B1 * | | 6/2002 | Lin ...................... F16B 23/0038 |
| | | | 411/404 |
| 6,575,062 B2 | | 6/2003 | Hahn |
| 6,601,482 B2 | | 8/2003 | Hughes et al. |
| 6,626,067 B1 | | 9/2003 | Iwinski et al. |
| 6,666,638 B2 | | 12/2003 | Craven |
| 6,679,141 B1 * | | 1/2004 | Bozonnet ............... F16D 1/101 |
| | | | 81/436 |
| D493,097 S | | 7/2004 | Shinjo |
| 6,786,827 B2 | | 9/2004 | Hughes et al. |
| 6,843,729 B2 * | | 1/2005 | Hughes ................ B25B 15/005 |
| | | | 470/8 |
| 6,852,037 B2 | | 2/2005 | Hughes |
| 6,886,433 B2 | | 5/2005 | Totsu |
| 6,890,139 B2 | | 5/2005 | Hughes |
| 6,941,635 B2 | | 9/2005 | Craven |
| 6,997,085 B2 | | 2/2006 | Yamamoto |
| 7,037,059 B2 | | 5/2006 | Dicke |
| 7,077,038 B2 | | 7/2006 | Toyooka et al. |
| D531,491 S | | 11/2006 | Liu |
| 7,225,710 B2 | | 6/2007 | Pacheco, Jr. |
| 7,293,949 B2 | | 11/2007 | Dilling |
| D557,131 S | | 12/2007 | Liu |
| 7,322,265 B2 | | 1/2008 | Chen |
| D567,644 S | | 4/2008 | Liu |
| 7,402,016 B2 | | 7/2008 | Mn-Feng |
| D581,776 S | | 12/2008 | Yin-Feng |
| 7,618,327 B2 | | 11/2009 | Dilling |
| 7,682,119 B2 | | 3/2010 | Chen |
| 7,695,228 B2 | | 4/2010 | Craven |
| 7,891,274 B2 | | 2/2011 | Dilling |
| D640,918 S * | | 7/2011 | Totsu ........................ D8/387 |
| 7,988,396 B2 | | 8/2011 | Weiss et al. |
| D649,446 S | | 11/2011 | Totsu |
| 8,171,826 B2 | | 5/2012 | Dilling |
| 8,182,187 B2 | | 5/2012 | Siong |
| D662,808 S | | 7/2012 | Vandenberg |
| 8,261,641 B2 * | | 9/2012 | Nojikawa ............. B25B 15/005 |
| | | | 81/436 |
| 8,291,795 B2 * | | 10/2012 | Hughes ................ B25B 15/005 |
| | | | 411/404 |
| 8,382,414 B2 | | 2/2013 | Vandenberg |
| D678,756 S | | 3/2013 | Tsai |
| 8,387,491 B2 | | 3/2013 | Dilling |
| 8,480,343 B2 | | 7/2013 | Vandenberg |
| D693,210 S | | 11/2013 | Vandenberg |
| 8,616,097 B2 | | 12/2013 | Hughes et al. |
| 8,904,622 B2 | | 12/2014 | Kochheiser |
| 8,926,249 B2 | | 1/2015 | Lin |
| 8,931,163 B2 | | 1/2015 | Kochheiser et al. |
| 8,955,417 B2 | | 2/2015 | Stiebitz et al. |
| D723,910 S | | 3/2015 | Totsu |
| 9,010,223 B2 | | 4/2015 | Huang |
| 9,044,843 B1 * | | 6/2015 | Mokhtee ............. B25B 15/005 |
| 9,103,364 B2 | | 8/2015 | Lin |
| 9,163,654 B2 | | 10/2015 | Barenski, Jr. et al. |
| 9,234,539 B2 | | 1/2016 | Gonciarz et al. |
| 9,261,127 B2 | | 2/2016 | Buhl |
| 9,297,402 B2 | | 3/2016 | Hughes |
| 9,322,422 B2 | | 4/2016 | Park |
| 9,482,258 B2 | | 11/2016 | Park |
| 9,562,557 B2 | | 2/2017 | Ross |
| 9,624,961 B2 | | 4/2017 | Lin |
| 9,903,406 B2 | | 2/2018 | Hughes |
| 9,970,470 B2 | | 5/2018 | Shih |
| 10,065,293 B2 | | 9/2018 | Hettich |
| D842,086 S | | 3/2019 | Vandenberg |
| 10,371,193 B2 | | 8/2019 | Hughes |
| 10,385,902 B2 | | 8/2019 | Wunderlich et al. |
| 10,436,238 B2 | | 10/2019 | Falkenstein et al. |
| 10,480,562 B2 | | 11/2019 | Shih |
| 10,697,499 B2 | | 6/2020 | Goss |
| 10,767,680 B2 | | 9/2020 | Lin |
| 10,767,681 B2 | | 9/2020 | Hargis |
| 10,865,824 B1 | | 12/2020 | Litzinger |
| 10,953,522 B2 | | 3/2021 | Dilling |
| 10,954,986 B2 | | 3/2021 | Ruhmann et al. |
| 10,954,990 B2 | | 3/2021 | Hughes |
| 10,995,788 B2 | | 5/2021 | Dilling |
| 11,098,743 B2 | | 8/2021 | Perego |
| 11,105,361 B2 | | 8/2021 | Lajewardi et al. |

(56) References Cited

U.S. PATENT DOCUMENTS

| | | |
|---|---|---|
| 11,149,445 B2 | 10/2021 | Vandenberg et al. |
| 11,149,776 B2 | 10/2021 | Hu |
| 11,346,388 B2 | 5/2022 | Dissing |
| 11,359,661 B2 | 6/2022 | Dissing |
| 11,371,547 B2 | 6/2022 | Shih |
| 11,396,898 B2 | 7/2022 | Hsu et al. |
| 11,466,720 B2 | 10/2022 | Dilling |
| D980,707 S | 3/2023 | Lee |
| 12,228,158 B2 | 2/2025 | Dilling |
| 12,384,007 B2 | 8/2025 | Dilling |
| 2002/0029665 A1 | 3/2002 | Hughes et al. |
| 2003/0059276 A1* | 3/2003 | Chen ............... F16B 23/0092 411/403 |
| 2003/0075027 A1 | 4/2003 | Brooks |
| 2003/0159551 A1* | 8/2003 | Hughes ............... B25B 15/005 81/460 |
| 2004/0033838 A1* | 2/2004 | Hughes ............... F16B 23/0023 83/13 |
| 2004/0062623 A1* | 4/2004 | Hughes ............... B25B 15/005 470/60 |
| 2005/0047891 A1 | 3/2005 | Toyooka et al. |
| 2005/0129486 A1* | 6/2005 | Totsu ............... B25B 13/485 411/402 |
| 2005/0249573 A1 | 11/2005 | Tanner |
| 2005/0265806 A1 | 12/2005 | Craven |
| 2006/0233626 A1 | 10/2006 | Lin |
| 2007/0037121 A1* | 2/2007 | Carter ............... A61C 8/0089 433/173 |
| 2007/0059122 A1 | 3/2007 | Lin |
| 2007/0128001 A1 | 6/2007 | Su |
| 2007/0157773 A1 | 7/2007 | Chen |
| 2007/0204552 A1 | 9/2007 | Onofrio |
| 2007/0217887 A1 | 9/2007 | Lin |
| 2007/0237606 A1 | 10/2007 | Takasaki |
| 2008/0038089 A1 | 2/2008 | Lin |
| 2008/0092699 A1 | 4/2008 | Surowiecki |
| 2008/0289455 A1 | 11/2008 | Goss |
| 2009/0162165 A1 | 6/2009 | Chen |
| 2009/0257844 A1* | 10/2009 | Chou ............... F16B 23/0023 411/410 |
| 2010/0196122 A1 | 8/2010 | Craven |
| 2010/0269644 A1 | 10/2010 | Edland et al. |
| 2011/0217143 A1 | 9/2011 | Hughes et al. |
| 2011/0217145 A1 | 9/2011 | Kochheiser et al. |
| 2012/0099944 A1 | 4/2012 | Kageyama et al. |
| 2012/0155990 A1 | 6/2012 | Chao |
| 2012/0165107 A1* | 6/2012 | Guo ............... B21K 1/463 81/460 |
| 2013/0011216 A1 | 1/2013 | Frank |
| 2013/0068075 A1 | 3/2013 | Stiebitz et al. |
| 2013/0071193 A1* | 3/2013 | Kocherovsky ...... B23B 29/0341 81/436 |
| 2013/0160616 A1* | 6/2013 | Hughes ............... F16B 23/003 81/460 |
| 2013/0213193 A1 | 8/2013 | Lukes |
| 2014/0060268 A1 | 3/2014 | Goss |
| 2014/0314522 A1 | 10/2014 | Lin |
| 2014/0331826 A1 | 11/2014 | Campbell |
| 2015/0152906 A1* | 6/2015 | Lai ............... F16B 23/003 411/403 |
| 2015/0266169 A1 | 9/2015 | Campbell, II |
| 2016/0059391 A1 | 3/2016 | Hettich |
| 2016/0186794 A1 | 6/2016 | Belinda et al. |
| 2016/0230799 A1 | 8/2016 | Pritchard |
| 2016/0305462 A1 | 10/2016 | Wunderlich et al. |
| 2017/0016468 A1 | 1/2017 | Lin |
| 2017/0227039 A1 | 8/2017 | Shih |
| 2017/0363130 A1 | 12/2017 | Dilling et al. |
| 2018/0009090 A1 | 1/2018 | Dilling |
| 2019/0186525 A1 | 6/2019 | Dilling |
| 2020/0332822 A1 | 10/2020 | Hsiao |
| 2020/0386256 A1 | 12/2020 | Dissing |
| 2020/0400183 A1 | 12/2020 | Maiwald et al. |
| 2021/0205965 A1 | 7/2021 | Dilling |
| 2021/0222722 A1 | 7/2021 | Hsu et al. |
| 2021/0239148 A1 | 8/2021 | Dilling |
| 2021/0277927 A1 | 9/2021 | Chen |
| 2021/0372457 A1 | 12/2021 | Dissing |
| 2022/0090621 A1 | 3/2022 | Shih |
| 2023/0003245 A1 | 1/2023 | Dilling |

FOREIGN PATENT DOCUMENTS

| | | | |
|---|---|---|---|
| CA | 2 183 211 A | 2/1998 | |
| CA | 2 466 700 C | 12/2006 | |
| CA | 2 708 419 C | 5/2017 | |
| CA | 2 897 872 C | 12/2017 | |
| CA | 3 040 891 C | 2/2021 | |
| CN | 1061839 A | 6/1992 | |
| CN | 1234099 A | 11/1999 | |
| CN | 1257971 A | 6/2000 | |
| CN | 1280653 A | 1/2001 | |
| CN | 101310935 A | 11/2008 | |
| CN | 102395447 A | 3/2012 | |
| CN | 202579561 U | 12/2012 | |
| CN | 103185055 A | 7/2013 | |
| CN | 105164432 A | 12/2015 | |
| DE | 296 01 092 U1 | 3/1996 | |
| DE | 296 21 922 U1 | 4/1998 | |
| DE | 202 03 279 U1 | 5/2002 | |
| DE | 298 24 767 U1 | 8/2002 | |
| DE | 10 2004 026 769 A1 | 12/2004 | |
| DE | 20 2004 020 104 U1 | 3/2005 | |
| DE | 20 2005 014 579 U1 | 11/2005 | |
| DE | 10 2005 052 694 A1 | 5/2007 | |
| DE | 20 2010 000 168 U1 | 9/2011 | |
| DE | 10 2011 008 167 A1 | 7/2012 | |
| DE | 20 2012 009 121 U1 | 11/2012 | |
| DE | 20 2015 105 276 U1 | 1/2016 | |
| DE | 10 2014 219 116 A1 | 3/2016 | |
| DE | 20 2016 103 748 U1 | 7/2016 | |
| DE | 10 2007 003 518 B4 | 12/2017 | |
| DE | 10 2014 003 022 B4 | 1/2018 | |
| DE | 10 2017 208 282 A1 | 11/2018 | |
| DE | 10 2017 217 740 A1 | 4/2019 | |
| DE | 20 2019 105 450 U1 | 1/2020 | |
| DE | 10 2018 125 672 A1 | 4/2020 | |
| DE | 10 2020 106 413 A1 | 3/2021 | |
| DE | 10 2019 219 492 A1 | 6/2021 | |
| DE | 10 2020 133 061 A1 | 6/2022 | |
| EP | 0 488 541 A1 | 6/1992 | |
| FR | 851032 E | 1/1960 | |
| FR | 78328 E | 6/1960 | |
| GB | 522331 A | 6/1940 | |
| GB | 1360644 A | 7/1974 | |
| GB | 1491515 | 11/1977 | |
| GB | 2564450 A | 1/2019 | |
| JP | 56-164212 A | 12/1981 | |
| JP | 7-37805 B2 | 4/1995 | |
| JP | 2003-13924 A | 1/2003 | |
| JP | 2004-197908 A | 7/2004 | |
| JP | 4141202 B2 | 8/2008 | |
| TW | 200303398 A | 9/2003 | |
| TW | M325405 U * | 1/2008 | ............ F16B 37/14 |
| TW | 201540968 A | 11/2015 | |
| WO | 2004/065067 A1 | 8/2004 | |
| WO | 2014121913 A1 | 8/2014 | |
| WO | 2016/048822 A1 | 3/2016 | |
| WO | 2017/218233 A1 | 12/2017 | |
| WO | 2020109760 A1 | 6/2020 | |
| WO | 2020160782 A1 | 8/2020 | |
| WO | 2022034004 A1 | 2/2022 | |

OTHER PUBLICATIONS

Written Opinion of the International Searching Authority issued in related application PCT/US/36065, completed Aug. 12, 2017 and mailed Sep. 1, 2017.

Office Action issued in corresponding Taiwanese Application No. 106122205, dated Oct. 16, 2018.

Office Action issued in counterpart Taiwanese application 108110653 on Oct. 28, 2019.

(56) References Cited

OTHER PUBLICATIONS

Supplementary European Search Report and European Search Opinion issued in corresponding application EP 17828127 on Feb. 5, 2020.
"National Document 2018-3624" found to be related to the subject and scope of application as cited on Search Report, filed in Chile on Dec. 14, 2018; corresponds to WO 2017/218233 A1.
Search Report issued in corresponding Chilean application 201900069 on Jan. 15, 2020.
Excerpts from Industrial Fasteners Institute IFI Inch Fastener Standards Book, 9th edition, 4 pages (2014).
International Search Report and Written Opinion for Application No. PCT/US2017/36065 mailed Sep. 1, 2017.

* cited by examiner

FASTENER SYSTEM WITH STABILIZER RIBS AND SQUARE DRIVE

RELATED APPLICATIONS

This application is a continuation-in-part of U.S. patent application Ser. No. 17/206,367, filed Mar. 19, 2021, now U.S. Pat. No. 12,384,007, which is a continuation of U.S. patent application Ser. No. 15/616,461, filed Jun. 7, 2017, now U.S. Pat. No. 10,953,522, which claims priority under 35 U.S.C. § 119 (e) to U.S. provisional patent application 62/360,741 filed on Jul. 11, 2016, the entirety of each of which are incorporated herein by reference.

BACKGROUND

Use of powered tools to drive threaded fasteners at high speed and high torque loads results in high forces applied by the driver to the fastener. Although many threaded fastener drive systems, particularly those with a driver-engageable recess in the fastener head, are designed to have surfaces that are engaged by corresponding surfaces on the driver, such ideal surface-to-surface engagement, at best, is difficult to achieve in practice. Rather than surface-to-surface engagement between the driver and fastener, by which the driving load can be distributed over a broad surface area, driver-recess engagement often is concentrated in small areas or points. Further, this is exasperated when the driver-recess engagement is not in line.

This may result from a number of factors such as inconsistencies in the manufacture of the fastener or the driver, as well as difficulties encountered in the field. Field-encountered difficulties may include, for example, misalignment of the driver and fastener or inability to fully seat the driver in the recess because of paint or other debris that may have collected in the recess. Even slight misalignment between the driver and the fastener, or a variation of the fastener or driver from design specifications, can result in substantial reduction in the area of contact between the driver and fastener, in many cases resulting in near point-like contact of several portions of the driver and fastener. Application of high torque under such circumstances necessarily results in concentrated stresses in the materials of the driver and the recess that, in turn, can lead to failure of the material, either by plastic deformation or fracture. Even slight plastic deformation of the engagement surfaces of the recess and driver can adversely affect system performance. If the recess deforms to define ramp-like surfaces inclined from the vertical, the driver may "cam-out" of the recess under the influence of the applied load. Such cam-out is undesirable, not only because it results in premature or uncontrollable disengagement of the driver and recess, but also because the suddenly disengaged driver can slip onto and damage the work piece. Additionally, excessive stress in the driver blade while driving the fastener can cause the blade to deform in a manner that reduces the surface area contact with the fastener and effectively shifts the region of contact radially inwardly, thereby reducing the effectiveness of driver-recess engagement and increasing the risk of failure.

It would be desirable to provide improvements in recessed head fasteners and drivers by which the foregoing and other difficulties are reduced or eliminated and stability is increased.

SUMMARY

Disclosed herein are various fasteners, fastener systems, drivers, punches, and methods of forming fasteners systems. Example fasteners may include a driver-engageable recess formed at an end thereof, the recess including a central core having a bottom region and a plurality of wings radiating outwardly from the central core, the wings each being defined by a pair of sidewalls and an outer transition surface adjoining the sidewalls, the outer transition surface extending from a top of the recess and connected to the bottom region and forming a bottom region transition edge at the intersection of the bottom region and the outer transition surface. In one example, a fastener may include an inner transition surface connecting a sidewall of a first wing to a sidewall of a second wing, the first and second wings being adjacent to each other. In another example, the recess inner transition surfaces conform a shape of a square. In another example, the fastener may include a groove in an inner transition surface extending in a radially outward direction from the inner transition surface, the groove extending from a first distance from the bottom region transition edge to a second distance from the bottom region transition edge. In one particular example, the first distance is nonzero. In one example, the groove extends to a top of the recess. And in yet another example the groove comprises a first and second groove walls, the first and second groove walls meeting at a groove apex, the groove apex being tapered radially inward toward a longitudinal axis of the fastener as the recess groove extends in a direction from the top of the recess toward the bottom region.

In one example, a groove apex is tapered at an angle of about 10.4 degrees from the longitudinal axis of the fastener. In another example, there is an angle of about 50.4 degrees between a first and a second groove walls. In one example, a groove apex intersects the inner transition surface at the first distance from the bottom region transition edge. And in yet another example a bottom region has a bottom recess tip that is a third distance from the bottom region transition edge. And in one example the first distance is greater than about 0.04 inches.

Disclosed herein are example fasteners, where, in one example a first and second intersection lines, formed at the intersection of the first and second groove walls with the transition surface, respectively, form an angle of between about 6.5 and about 7.0 degrees between them. In another example the inner transition surface is tapered at an angle of between about 3.5 degrees and about 4.0 degrees from a longitudinal axis of the fastener. In one example at least one of the sidewalls further includes a relieved region defined radially inward of its associated outer transition surface to define a relatively raised torque pad between its respective outer transition surface and the relieved region, the torque pad being an elongate strip and extending longitudinally along a margin of the sidewall that adjoins the outer transition surface. And in yet another example the recess comprises four wings and at least two of the inner transition surfaces have the recess groove. And in yet another example at least one of the sidewalls is configured to define a segment of a spiral. In one example, at least one of the inner transition surfaces includes an interference surface having a top and a distance from the top to the bottom region transition edge is less than the first distance.

Disclosed herein are fastener systems. In one example a fastener includes a central recess core having a bottom region. In one example a fastener includes a plurality of wings radiating outwardly from the central recess core, the wings each being defined by a pair of recess sidewalls and a recess outer transition surface adjoining the recess sidewalls, the recess outer transition surface extending from a top of the recess and connected to the bottom region and forming a bottom region transition edge at the intersection of the bottom region and the outer transition surface. And in another example, at least one recess inner transition surface connecting a recess sidewall of a first wing to a recess sidewall of a second wing, the first and second wings being adjacent to each other. And in yet another example a recess includes a groove in the inner transition surface extending in a radially outward direction from the inner transition surface, the groove extending from a first distance from the bottom region transition edge to a second distance from the bottom region transition edge. And in yet another example, the first distance being nonzero.

In one example a fastener system includes a driver for engaging the recess of a fastener, the driver including a shank portion and a recess-engaging portion formed at an end of the shank portion, the recess-engaging portion comprising a central driver core having an end region and a plurality of lobes radiating outwardly from the driver central core, each lobe being defined by a pair of driver sidewalls and a driver outer transition surface adjoining the driver sidewalls, the driver outer transition surface extending from the shank portion and connected to the end region and forming an end region outer transition edge at the intersection with the driver end region. And in yet another example, at least one driver inner transition surface connecting a driver sidewall of a first lobe to a driver sidewall of a second lobe, the first and second lobes being adjacent to each other. In one example, a driver includes a stabilizing rib on the driver inner transition surface extending in a radially outward direction from the driver central core, the stabilizing rib extending from a first distance from end region outer transition edge to a second distance from the end region outer transition edge, the first distance being nonzero. And in yet another example the groove comprises a first and second groove walls, the first and second groove walls meeting at a groove apex, the groove apex being tapered radially inward as the recess groove extends in a direction from the top of the recess toward the bottom region. And in another example, a stabilizer rib comprises a first and second rib walls, the first and second rib walls meeting at a rib apex, the rib apex being tapered radially inward as the stabilizer rib extends toward the end region.

In one example, the groove apex is tapered at an angle with respect to a longitudinal axis of the fastener and the stabilizer apex is tapered at an angle with respect to a longitudinal axis of the driver, the groove apex taper angle being larger than the stabilizer apex taper. And in another example a groove apex is tapered at an angle of about 10.4 degrees from the longitudinal axis of the fastener. And in another example the stabilizer apex is tapered at an angle of about 7.5 to about 8.5 degrees from the longitudinal axis of the driver. And in yet another example, there is an angle of about 50.4 degrees between the first and second groove walls. In one example wherein there is an angle of about 70 degrees between the first and second stabilizer walls. In another example, the groove apex intersects the inner transition surface at the first distance from the bottom region transition edge. And in yet another example the stabilizer apex meets the inner transition surface at the interference region from the end region outer transition edge.

In one example of disclosed fastener systems, a first and second intersection line, formed at the intersection of the first and second groove walls with the recess inner transition surface, respectively, form an angle of between about 6.5 and about 7.0 degrees between the groove walls. In another example the driver inner transition surfaces are tapered at an angle with respect to the longitudinal axis of the driver and the recess inner transition surfaces are tapered at an angle with respect to the longitudinal axis of the recess, the driver inner transition surface taper angle being less than the recess inner transition surface taper angle. And in yet another example the recess inner transition surface is tapered at an angle of about 3.5 to about 4.0 degrees, inclusive from a longitudinal axis of the fastener. And in another example the driver inner transition surface is tapered at an angle of about 2.25 to about 2.75 degrees, inclusive from a longitudinal axis of the fastener. And in yet another example, at least one of the recess sidewalls further comprises a relieved region defined radially inwardly of its associated recess outer transition surface to define a relatively raised torque pad between the recess outer transition surface and the recess central core, the torque pad being an elongate strip and extending longitudinally along a margin of the sidewall that adjoins the outer transition surface.

In a further example, disclosed example faster systems include a recess having four wings and at least two of the inner transition surfaces have the recess groove. In one example a driver includes at least one torque rib formed on at least one sidewall of at least one of the sidewalls of the lobes, the at least one torque rib being oriented to extend substantially perpendicular to the outer transition surface of the lobe and increasing in cross-sectional area in a radially outward direction. In another example, a radially outermost end of the at least one torque rib defines the widest portion of the lobe. And in another example, at least one torque rib is generally triangular in a transverse cross-section. And in yet another example, at least one of the recess inner transition surfaces comprises an interference surface having a top defined by a design recess interference region and a distance from the top to the bottom region transition edge is less than the first distance to the groove. In one disclosed fastener system, at least one of the driver inner transition surfaces comprises an interference surface having a top defined by a design driver interference region and a distance from the top to the end region outer transition edge is less than the first distance to the stabilizing rib. And in another example fastener system, the fastener system includes a clearance distance between the top of the recess interference region and the groove. And in yet another example fastener system, the fastener system includes a clearance distance between the top of the driver interference region and the rib.

In another example, disclosed example faster systems include a fastener having a recess, the recess including a central recess core having a bottom region, a plurality of recess surfaces extending from a top of the recess and connected to the bottom region and forming a bottom region transition edge at the intersection of the bottom region and the recess surfaces, a groove in at least one of the recess surfaces extending in a radially outward direction from the at least one recess surface, the groove extending from a first distance from the bottom region transition edge to a second distance from the bottom region transition edge, the first distance being nonzero, wherein the at least one recess surface includes a recess interference surface defining a design recess interference region located between the groove and the recess bottom region, the systems further including a driver for engaging the recess of the fastener, the driver including a shank portion and a recess-engaging portion formed at an end of the shank portion, the recess-engaging portion comprising a driver central driver core having an end region and a plurality of driver surfaces connected to the end region and forming an end region transition edge at the intersection with the driver end region, a stabilizing rib on at least one of the driver surfaces extending in a radially outward direction from the driver central core, the stabilizing rib extending from a first distance from end region outer transition edge to a second distance from the end region outer transition edge, the first distance being nonzero, wherein the at least one driver surface includes a driver interference surface defining a design driver interference region located between the stabilizing rib and the driver end region, and wherein, in normal coaxial insertion between the driver and the fastener, the recess interference surfaces and the driver interference surfaces establish an interference fit located between the groove and the recess bottom region and between the stabilizing rib and the driver end region transition edge preventing the driver end region from bottoming out in the recess bottom region. In another example, the fastener system includes at least one of the recess surfaces having an interference surface having a top defined by a design recess interference region and a distance from the top to the bottom region transition edge less than the first distance to the groove. In another example, the fastener system includes, in normal coaxial insertion between the driver and the fastener, a clearance present between the stabilizing rib and the groove. In another example, the fastener system includes the groove having a first and second groove walls, the first and second groove walls meeting at a groove apex, the groove apex being tapered radially inward as the groove extends in a direction from the top of the recess toward the bottom region, wherein the stabilizing rib comprises a first and second rib walls, the first and second rib walls meeting at a stabilizing rib apex, the rib apex being tapered radially inward as the stabilizer rib extends toward the end region, and wherein the groove apex is tapered at a groove apex taper angle with respect to a longitudinal axis of the fastener and the stabilizing rip apex is tapered at a stabilizing apex taper angle with respect to a longitudinal axis of the driver, the groove apex taper angle being larger than the stabilizing apex taper angle. In another example, the fastener system includes the recess grooved surfaces and the driver ribbed surfaces conforming to a shape of a polygon. In another example, the fastener system includes the recess grooved surfaces and the driver ribbed surfaces conforming to a shape of a square. In another example, the fastener system includes the recess grooved surfaces and the driver ribbed surfaces conforming to a shape of a hexagon.

Disclosed herein are methods of forming a threaded fastener. In one example method, the method includes forming a threaded fastener having a driver-engageable recess formed at an end thereof. In one example, the method includes using a punch to form the recess, the punch including, a central core having a bottom forming portion and a plurality of wing forming portions radiating outwardly from the central core, the wing forming portions each being defined by a pair of sidewall forming portions and an outer transition surface forming portion adjoining the sidewall forming portions, the outer transition surface forming portion connected to the bottom region forming portion and forming a bottom region transition edge forming portion at the intersection of the bottom region forming portion and the outer transition surface forming portion. In another example method, the punch includes at least one inner transition surface forming portion connecting a sidewall forming portion of a first wing forming portion to a sidewall of a second wing forming portion, the first and second wing forming portions being adjacent to each other. In yet another example method, the punch includes a groove forming portion in the inner transition surface forming portion extending in a radially outward direction from the inner transition surface forming portion, the groove forming extending from a first distance from the bottom region transition edge forming portion to a second distance from the bottom region transition edge forming portion, the first distance being nonzero.

In one example method, the punch includes a groove forming portion having a first and second groove wall forming portions, the first and second groove wall forming portions meeting at a groove apex forming portion, the groove apex forming portion being tapered radially inward toward a longitudinal axis of the fastener as the recess groove forming portions extends in a direction from a body toward the bottom region forming portion. In another example method, a punch includes a groove apex forming portion is tapered at an angle of about 10.4 degrees from the longitudinal axis of the punch.

Additional details will be provided in the accompanying figures and the detailed description below.

DETAILED DESCRIPTION

Figure 1:
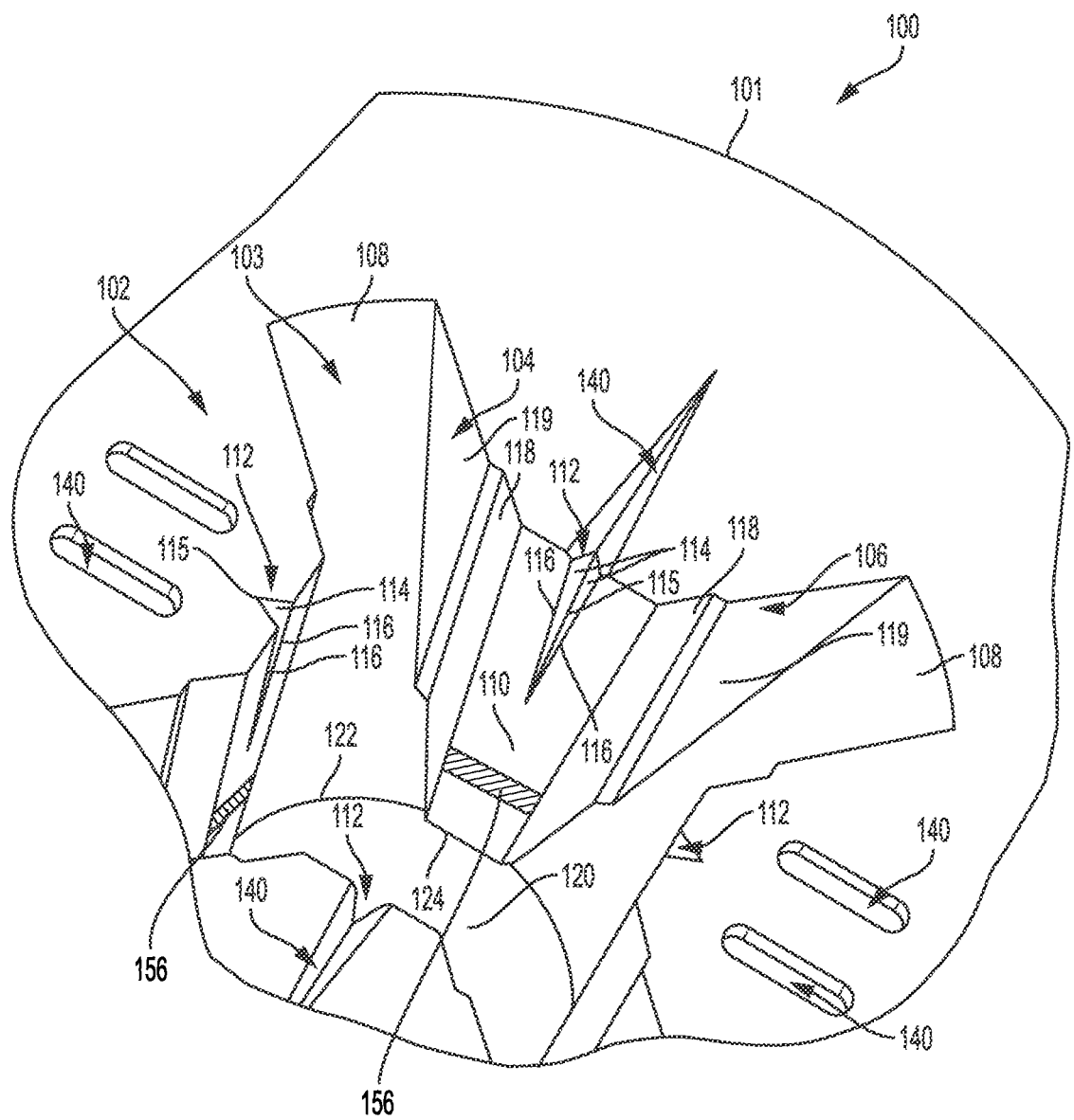
FIG. 1 is a partial perspective view of an example fastener recess in accordance with disclosed embodiments.

Like reference numerals throughout this specification refer to similar features throughout the figures.

Figure 2:
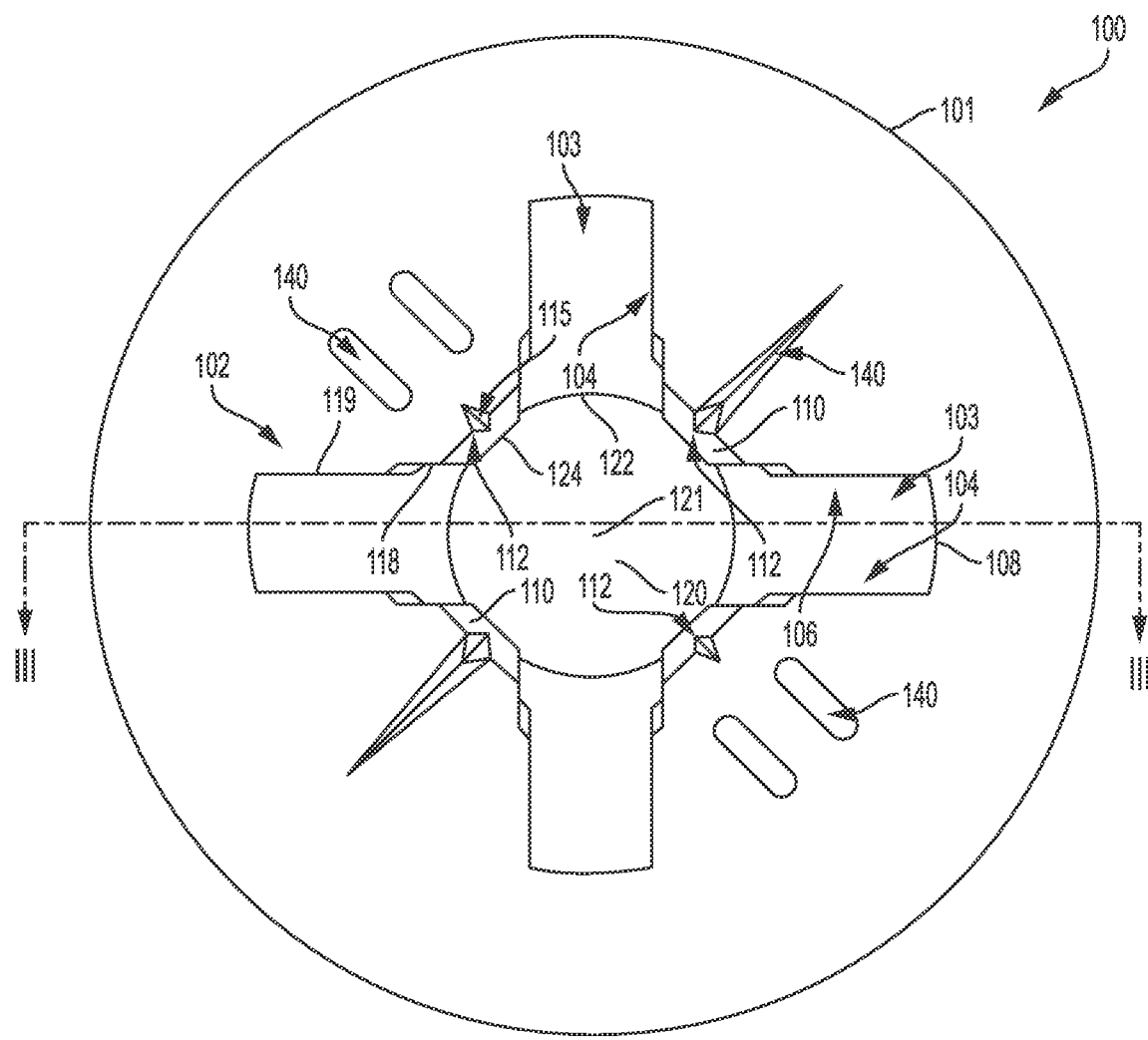
FIG. 2 is an end view of an example fastener recess in accordance with disclosed embodiments.
Figure 3:
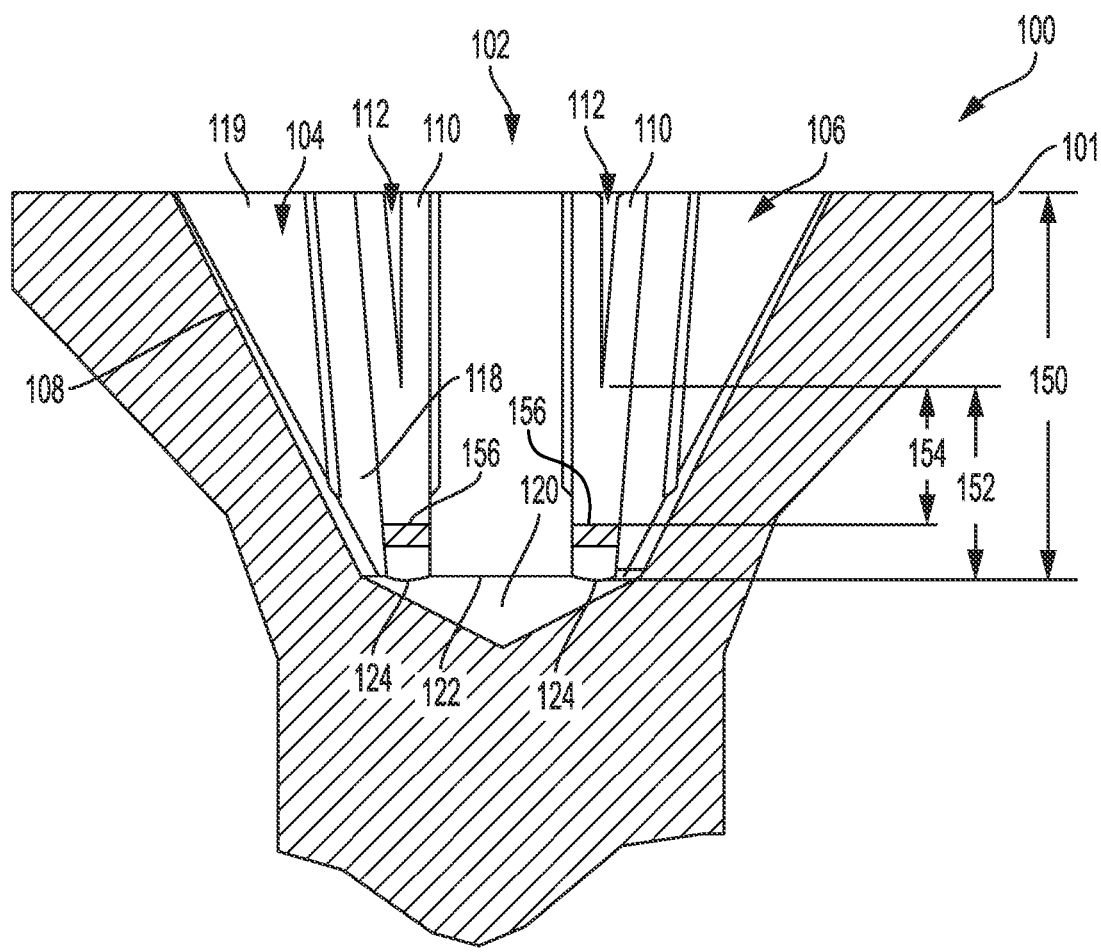
FIG. 3 is a cross section view taken along line of FIG. 2.
Figure 4:
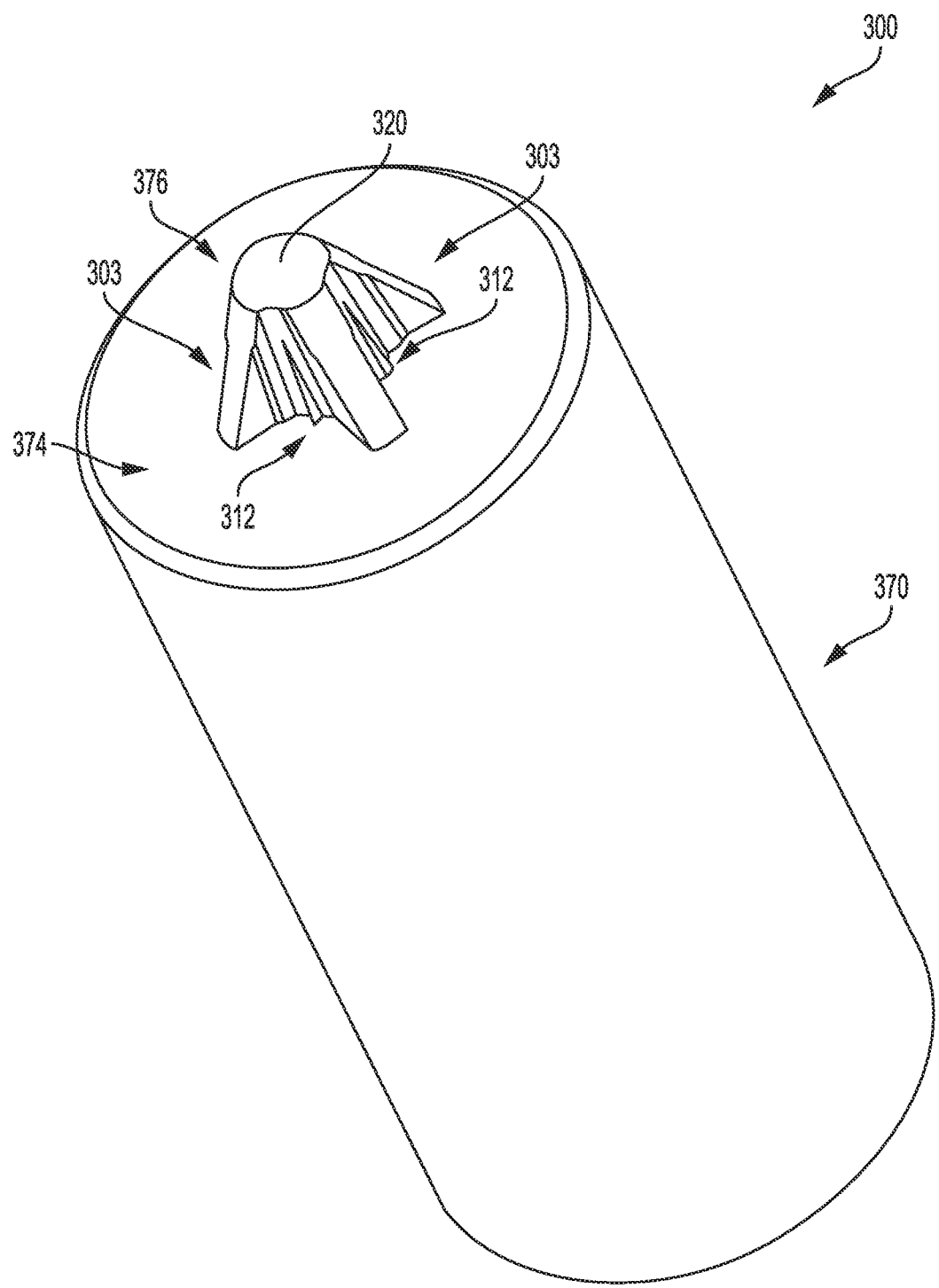
FIG. 4 is a perspective view of an example punch in accordance with disclosed embodiments.
Figure 5:
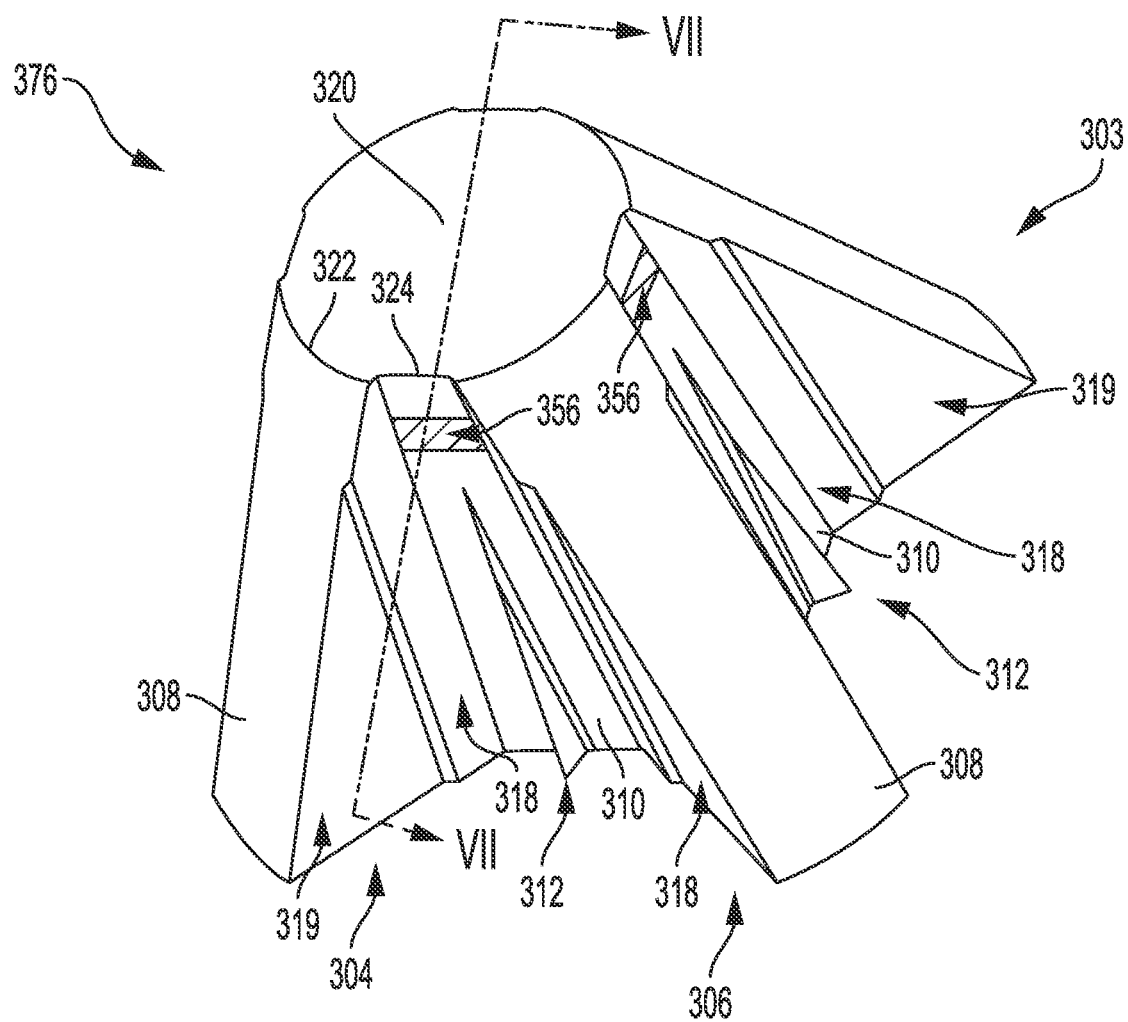
FIG. 5 is a perspective view of an example punch in accordance with disclosed embodiments.

FIGS. 1 through 3 show various views of an example fastener recess. Fastener 100 has a driver-engageable recess 102 formed in head 101. The driver-engageable recess is of polygonal form that may be defined as generally cruciform in plan. The recess includes a central core and a plurality of wings 103 that radiate outwardly from the central portion. The wings 103 are each defined by an installation sidewall 104, a removal sidewall 106, which are separated from each other by an outer transition surface 108, which is shown as downwardly (away from the head 101) and inwardly inclined. The sidewalls 104 and 106 are referred to herein as installation sidewalls 104 and removal sidewalls assuming a right-handed fastener thread. An inner transition surface 110 extends between the installation and removal surfaces of adjacent wings.

In one example, the wings 103 generally conform in dimension to that of a standard cruciform shape, for example the dimensions described with respect to various cruciform recesses within the Industrial Fasteners Institute's *IFI Inch Fastener Standards Book*, $9^{th}$ edition, 2014, which is herein incorporated by reference in its entirety. For the remainder of this disclosure a reference to "standard" refers to those standards established by the IFI standards unless otherwise specified. The inner transition surfaces 110, in one example, generally conform to the shape of a standard square recess, for example those square recesses described in the IFI standards. Modifications to those standards will be apparent from the present disclosure. The recess 102, having wings 103 and inner transition surfaces 110, along with a corresponding driver, may in one example generally conform to the various dimensions of a Phillips Square-Driv® (PSD) recess and driver, available as of this writing from Phillips Screw Company of Amesbury, Massachusetts, USA. However, features of the present disclosure may also be incorporated into non-driving surfaces of other fasteners and fastener systems. For example, embodiments of the present disclosure can be incorporated into existing fastener designs, for example Phillips Screw Company's commercially available fasteners, for example, those available under the trade designations Pozidriv®, Torq-Set®, Tri-Wing®, Phillips II®, Hexstix®, Torq-Set®, Mortorq®, Mortorq® Super, External Mortorq® Super, among other multi-winged fasteners having, for example, 2, 3, 4, 5, 6, or more wings. In addition, those fasteners/drivers disclosed that are, at least in part, defined by spiral segments, for example, those described in U.S. Pat. Nos. 5,957,645, 6,234,914, and 6,367,358 issued to Stacy (the Stacy patents), U.S. Pat. Nos. 7,891,274, 8,171,826, and 8,387,491 issued to Dilling (the Dilling patents), and US patent publication 2017/363,130 (the '130 publication), all of which are commonly owned with this application. The disclosures of these patents/publications are incorporated herein by reference in each of their entireties.

Continuing with the example embodiments of FIGS. 1 through 3, the outer transition surfaces 108 and the inner transition surfaces 110 merge into a generally concave recess bottom region 120. The outer transition surfaces 108 meet the bottom region 120 at bottom region transition edge 122. The inner transition surfaces 110 meet the bottom region 120 at the inner transition bottom edge 124. At least one inner transition surface 110 includes a groove 112 within the inner transition surface 110. The groove 112 extends radially outward from the inner transition surface. Therefore, a driver conforming to the dimensions of the recess 102 will fit within the recess 102 whether or not the driver includes a stabilizing rib (discussed in more detail below). The groove(s) 112 interact with corresponding stabilizing rib(s) to stabilize the driver within the recess and to minimize rocking of the driver. This feature will be discussed further below.

In one example, the recess 102 includes more than one inner transition surfaces 110 having a groove 112. For example, in one embodiment, diametrically opposed inner transition surfaces each have grooves 112. The recess 102 can include, for example, any number of pairs of diametrically opposed grooves 112. As shown in FIGS. 1-2, the recess 102 includes two pairs of diametrically opposed grooves 112, or in the alternative one, three, four, or more pairs for recesses with different configurations.

The groove 112, in one example, includes groove walls 114 connected together at groove apex 115. The groove walls intersect the inner transition surfaces 110 at intersection lines 116. The angle between the groove walls may be any angle configured to provide the desired stability and also based on the size and configuration of the recess. In one example, the angle between the groove walls 114 is between about 40 degrees and about 60 degrees, or about 50.4 degrees for a PSD size 1-2 recess. In one example, a PSD size nomenclature M-N refers to a PSD recess/driver conforming to an "M" size square and a "N" size Phillips/cruciform in accordance with sizes available from Phillips Screw Company and as disclosed in the IFI standards.

The inner transition surfaces 110, in one example, are tapered inward toward the longitudinal axis of the fastener from the top of the recess towards the bottom region 120. The taper of the inner transition surfaces 110 establishes interference surfaces 156 (indicated in diagonal markings) for providing an interference fit with cooperating surfaces of the corresponding driver.

One or both of the installation or removal sidewalls 104, 106 may be provided, in one example, with a relieved region 118 that extends from the upper edge of the corresponding sidewall 104, 106 downwardly toward the bottom of the sidewall. The relieved regions 118 are formed so that the unrelieved portion of their respective sidewall defines a torque pad 119 in the form of a relatively raised strip that extends along the outer margin of its associated sidewall, that is, where the sidewall meets with the outer transition surface 108 of the wing 103. The torque pad 119 is intended to be engaged by the most radially outward regions of the lobes of the mating driver to assure that the driving torque will be applied to the recess drive walls at the most radially outward location of the recess drive walls. The relieved region 118 is designed and configured so that the driver blade, in one example, will not engage those portions of the sidewalls 104, 106 defined by the relieved regions 118. Additional information regarding example torque pads and relieved regions 118 may be found, for example in U.S. Pat. Nos. 6,223,634, 6,601,482, and 6,786,827 to Hughes et al ("the '634 patents), which are herein incorporated by reference in their entireties. By maintaining engagement of the driver blades with the outermost regions of the sidewalls, the moment arm of the applied torque is maximized, thereby reducing the force necessary to develop the desired level of torque and, consequently reducing the risk of undesirable deformation of the recess. The top of the recess may also include head markings 140, which may contact a top surface of the grooves 112 without detrimental impact to the grooves 112.

With respect to FIG. 3, the groove 112 begins a distance 152 from the bottom region transition edge 122 and continues to the top of the recess 102, which is a distance 150 from the bottom region transition edge 122. In one particular example, the distance 152 is greater than zero such that the groove 112 does not extend to the bottom region 120, thus not interfering with a stick fit feature. In one particular example, the groove 112 has a groove clearance distance 154 greater than about zero from the top of the interference surface 156.

Disclosed example recesses may be formed by a heading punch adapted to form the head of the fastener with the disclosed corresponding recess. The recess can be formed in conventional heading techniques in, for example, a two-blow header. FIGS. 4 through 8 illustrate a punch 300 configured to form an example disclosed recess. The punch is a positive corresponding to the negative of the recess 102 embodiments described with respect to FIGS. 1-3. Thus, features and dimensions described with reference to disclosed punches 300 are also applicable to corresponding recess 102 features and embodiments and vice versa.

The punch includes body portion 370 having a face 374 and an integral nib 376 that protrudes from the face 374. The nib 376 is the complement of the shape of the recess and the face of the punch is of complementary shape to that of the intended screw head, shown here as a flathead. With respect to FIG. 5, the nib 376 includes a central core and a plurality of wing forming portions 303 that extend generally radially and outwardly from the core. Each wing forming portion 303, as shown, includes a relieved region forming portion 318 and a torque pad forming portion 319 forming the respective installation and removal sidewall forming portions 304, 306, and an outer transition surface forming portion 308. An inner transition surface forming portion 310 extends between the installation and removal surface forming portions of adjacent wings.

The outer transition surface forming portion 308 and the inner transition surface forming portions 310 merge into a bottom region forming portion 320. The outer transition surface forming portions 308 meet the bottom region forming portions 320 at bottom region transition edge forming portion 322. The inner transition surface forming portions 310 meet the bottom region forming portion 320 at the inner transition bottom edge forming portion 324. At least one inner transition surface forming portions 310 includes a groove forming portion 312 in the inner transition surface forming portion 310. The groove forming portion 312 extends radially outward from the inner transition surface forming portion 310.

The inner transition surface forming portions 310, in one example, are tapered inward toward the longitudinal axis of the punch 300 from the body portion 370 towards the bottom region forming portion 320. The taper of the inner transition surface forming regions 310 establish (on the corresponding formed recess) interference surfaces, which are shown on the punch as interference surface gauging area 356 (indicated in diagonal markings). The location of the resulting interference surfaces on the formed recess will depend on the size and configuration of the recess and the size and configuration of the driver used within the recess. For example, the resulting interference surface 156 (FIGS. 1 and 3) are regions of the inner transition surface 110 in which the corresponding driver is designed to make contact with the recess (before applying installing or removing torque) and where an interference or stick-fit occurs between the recess and the driver. During manufacture and operation of the punch, the interference surface forming gauging area 356 can be checked (or gauged) to ensure interference surface gauging area 356 fall within design tolerances. Provided the inference surface gauging area 356 is within tolerances, the interference fit between the recess and the driver should occur in the proper location, i.e., between the groove 112 and bottom region 120 of the recess and between the stabilizing rib 212 and the end region 220 of the driver, discussed below. This location of the interference surface/interference surface gauging area 356 can be altered, that is moved higher or lower in the recess (and on the corresponding recess forming punch) depending on the recess/driver design and at what recess depths an interference fit is desired.

Figure 6:
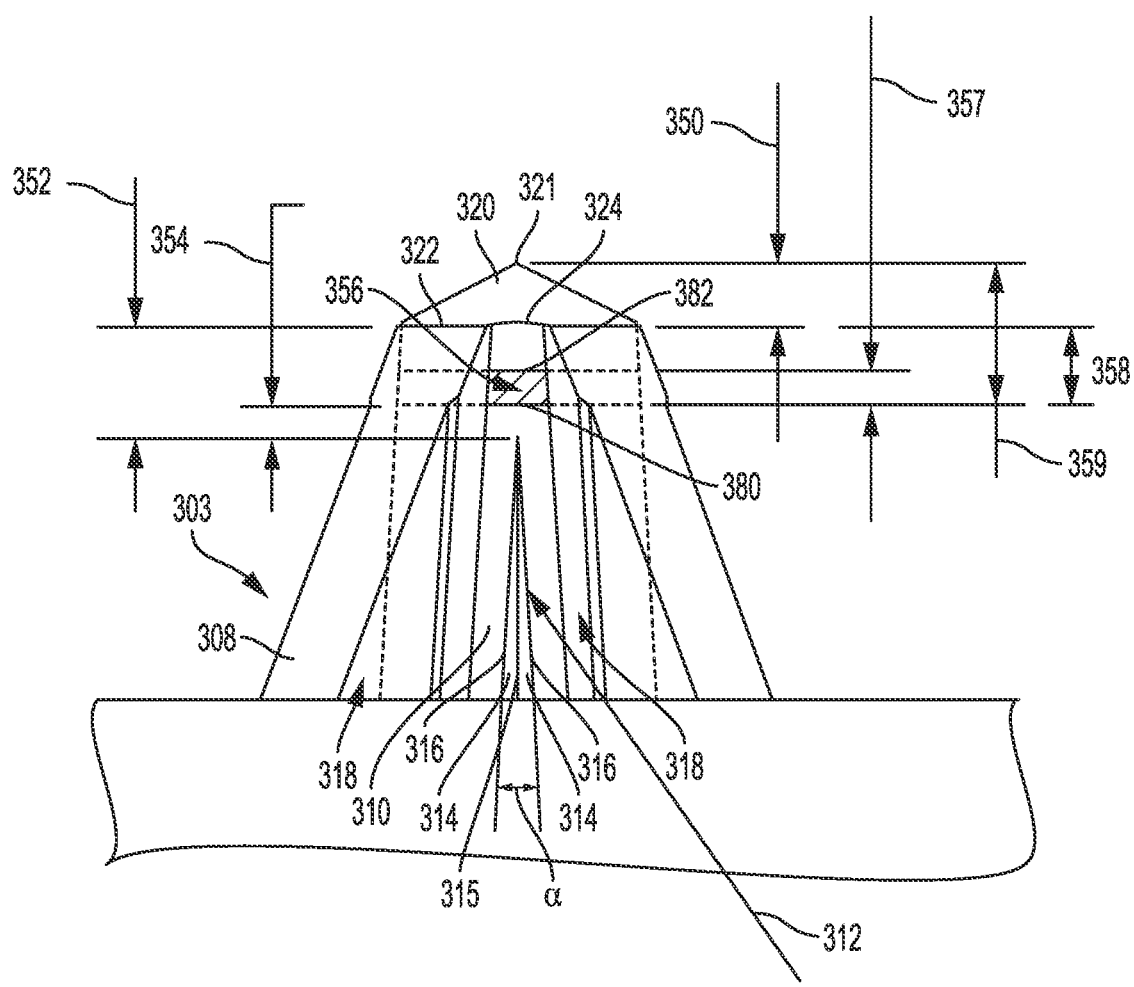
FIG. 6 is a side view of an example punch in accordance with disclosed embodiments.

With reference to FIG. 6, the groove forming portion 312, in one example, includes groove wall forming portions 314 connected together at groove apex forming portion 315. The groove wall forming portions intersect the inner transition surface forming portions 310 at intersection lines 316. The angle between the groove wall forming portions may be any angle configured to provide the desired recess groove. In one example, the angle δ (FIG. 8) between the groove wall forming portions 314 is between about 40 degrees and about 60 degrees, or about 50.4 degrees for a PSD size 1-2 recess. The angle α between the intersection lines 316, within the plane of the inner transition surface forming portion 310, is between about 6.5 and about 7.0 degrees, inclusive, for a punch design to form a recess for a PSD size 1-2 recess.

The bottom region forming portion has a distance 350 between a tip forming portion 321 and the bottom region transition edge forming portion 322. The top 380 of the interference surface gauging area 356 is a distance 358 from the bottom region transition edge forming portion 322 and has a distance 357 between the top 380 and bottom 382 of the interference surface gauging area 356 defining, in one example, the location of acceptable design limits of the interference surface gauging area 356 for gauging. Distance 357, in one example may be between about 0.001 inches and about 0.012 inches, inclusive. And in one example is about 1 hundredth of an inch. Or, for example, about 0.012 inches. And in another example, no more than 0.012 inches.

The top 380 of the interference surface gauging area 356 has a distance 359 from a tip forming portion 321. Groove forming portion 312 may begin, i.e., the point of intersection of intersecting lines 316 to each other and the inner transition surface forming portion 310, at a distance 352 from the bottom region transition edge forming portion 322, resulting in a clearance distance 354 between the top 380 of the interference surface gauging area 356 and the groove forming portion 312.

The clearance distance 354 may be determined to provide clearance from the interference surface gauging area 356 such that the groove forming portion 312 will not interfere with gauging the interference surface gauging area 356 of inner transition surfaces 310. Gauging is important to ensure that formed fasteners are within tolerances. In one example, the clearance distance 354 may also depend on the desired amount of engagement between the resulting groove and driver stabilizer rib, discussed in more detail below. In certain non-limiting examples, the clearance distance 354 may be between about 0.005 inches and about 0.011 inches, inclusive, between about 0.005 and about 0.012 inches, inclusive, or about 0.011 inches.

Table 1 includes non-limiting examples of the dimension references discussed with reference to FIG. 6. The example dimensions are listed with reference to corresponding PSD driver sizes. The drivers are commercially available from Phillips Screw Company.

TABLE 1

| DRIVE SIZE | 359 | 354 | 357 | 350 | 352 | 358 |
|---|---|---|---|---|---|---|
| | | | (inches) | | | |
| PSD 0-1 | .057 | .005 | .012 | .013 | .049 | .044 |
| PSD 1-2 | .052 | .011 | .012 | .023 | .040 | .029 |
| PSD 2-2 | .074 | .011 | .012 | .023 | .062 | .051 |
| PSD 3-3 | .069 | .011 | .012 | .039 | .041 | .030 |

Dimension Formulas: (359 + 354) − 350 = 352  359 − 350 = 358

Figure 7:
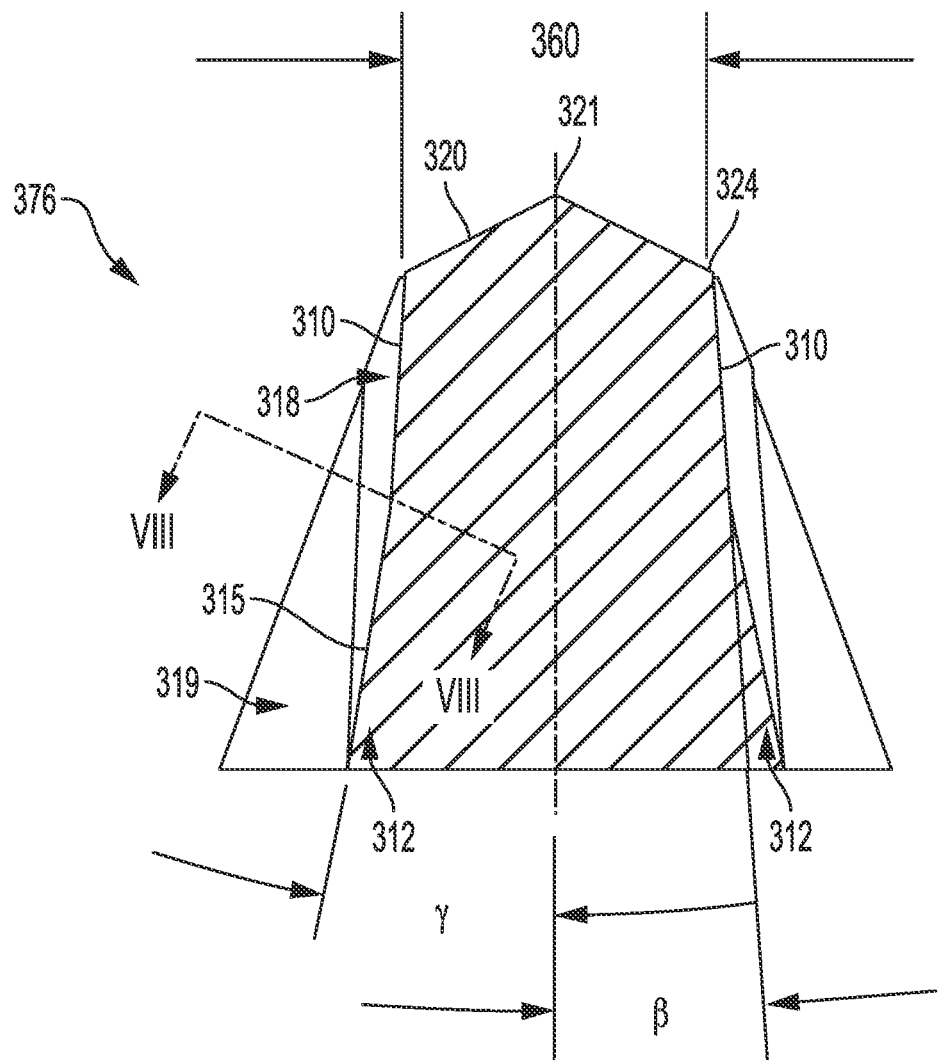
FIG. 7 is a cross section view taken along line VII-VII of FIG. 5.

With reference to FIG. 7, in one example, the distance 360 between the opposing inner transition surfaces 310 at the inner transition bottom edge forming portion 324 conforms to a standard square recess for the respective driver size. In one example, distance 360 is between about 0.0852 inches and about 0.0842 inches, inclusive for a PSD 1-2 size driver. In one example, the inner transition surface forming portion (and resulting inner transition surfaces), are tapered inward toward the longitudinal axis of the punch integral nib 376 toward the tip forming portion 321 at a taper angle $\beta$ with respect to the longitudinal axis of the integral nib 376. In one example the taper angle $\beta$ is between about 3.5 degrees and about 4 degrees, inclusive. In another example, the taper angle $\beta$ is between about 2.5 degrees and about 4 degrees, inclusive. The taper angle taper angle $\beta$ will establish the interference fit with the driver as will be discussed below. Therefore, other taper angles may also be appropriate in accordance with the design of the respective driver.

In one example, the groove apex forming portion 315 is tapered inward toward the longitudinal axis of the punch integral nib 376 toward the tip forming portion 321 at a groove apex taper angle $\gamma$ with respect to the longitudinal axis of the integral nib 376. In one example the groove apex taper angle $\gamma$ is between about 8 degrees and about 12 degrees, inclusive. In one example the groove apex taper angle $\gamma$ is about 10.4 degrees. The groove apex taper angle taper angle $\gamma$ will establish the stabilizing effect with the driver as will be discussed below. Therefore, other taper angles may also be appropriate in accordance with the design of the respective driver.

Figure 8:
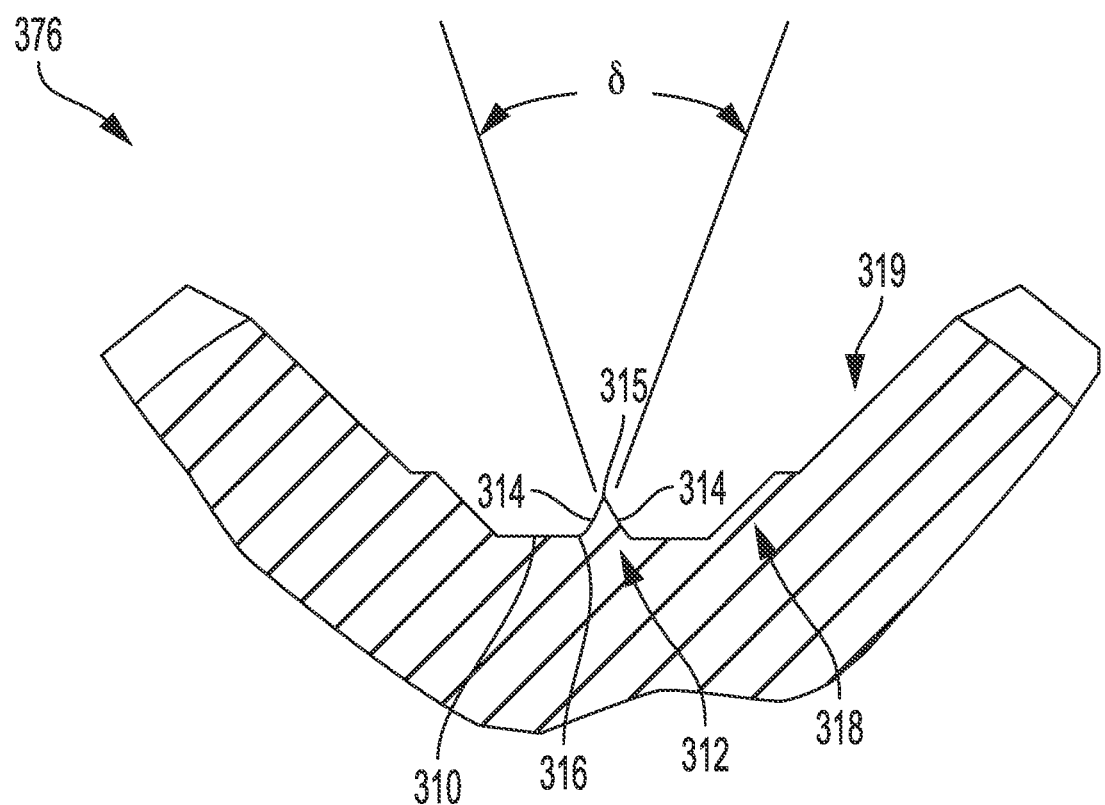
FIG. 8 is a cross section view taken along line VIII-VIII of FIG. 7.

FIG. 8 shows a cross section of one example of a groove forming portion 312. Groove forming portion 312 includes groove wall forming portions 314 connected together at groove apex forming portion 315. The groove wall forming portions 314 intersect the inner transition surface forming portions 310 at intersection lines 316. The angle $\delta$ between the groove wall forming portions may be any angle configured to provide the desired stability and based on the size and configuration of the recess. In one example, the angle $\delta$ is between about 40 degrees and about 60 degrees, or about 50.4 degrees for a PSD size 1-2 recess. However, other angles will be apparent from the present disclosure.

FIGS. 9 through 13 show various views of an example driver 200. Driver 200 has a recess-engageable portion formed on a shank (not shown). The driver 200 is of polygonal form that may be defined as generally cruciform in plan. The driver includes a central portion and a plurality of lobes 203 that radiate outwardly from the central portion. The lobes 203 are each defined by an installation sidewall 204, a removal sidewall 206, which are separated from each other by an outer transition surface 208, which is shown as downwardly and inwardly inclined (assuming the driver tip 221 is pointed down into a recess). The sidewalls 204 and 206 are referred to herein as installation sidewalls 204 and removal sidewalls 206 assuming the driver is installing or removing right-handed fastener thread. An inner transition surface 210 extends between the installation and removal surfaces 204, 206 of adjacent lobes 203.

In one example, the lobes 203 generally conform in dimension to that of a standard cruciform shape or standard cruciform driver. The inner transition surfaces 110, in one example, generally conform to the shape of a standard square driver, for example those square drivers described in the IFI standard or otherwise dimensioned to engage with the standard recesses described in the IFI standard. Modifications to those standards will be apparent from the present disclosures. The recess engageable portion 202, in one example, has lobes 203 and inner transition surfaces 210, that may, in one example, generally conform to the various dimensions of a PSD driver, available as of this writing from Phillips Screw Company. However, features of the present disclosure may also be incorporated into non-driving surfaces of other fasteners and fastener systems. For example, embodiments of the present disclosure can be incorporated into existing driver designs, for example Phillips Screw Company's commercially available drivers, for example, those available under the trade designations Pozidriv®, Torq-Set®, Tri-Wing®, Phillips II®, Hexstix®, Torq-Set®, Mortorq®, Mortorq® Super, External Mortorq® Super, among others multi-winged fasteners having, for example, 2, 3, 4, 5, 6, or more wings. In addition, those fasteners/drivers disclosed that are, at least in part, defined by spiral segments, for example, those described in the Stacy patents, the Dilling patents, and/or the '130 publication.

Continuing with the example embodiments of FIGS. 9 through 12, the outer transition surfaces 208 and the inner transition surfaces 210 merge into a generally convex driver end region 220. The outer transition surfaces 208 meet the end region 220 at end region outer transition edge 222. The inner transition surfaces 210 meet the end region 220 at the end region inner transition edge 224. At least one inner transition surface 210 includes a stabilizing rib 212. The stabilizing rib 212 extends radially outward from the inner transition surface 210. The stabilizing rib(s) 212 interact with corresponding stabilizing groove(s) to stabilize the driver within the recess and to minimize rocking of the driver.

Figure 9:
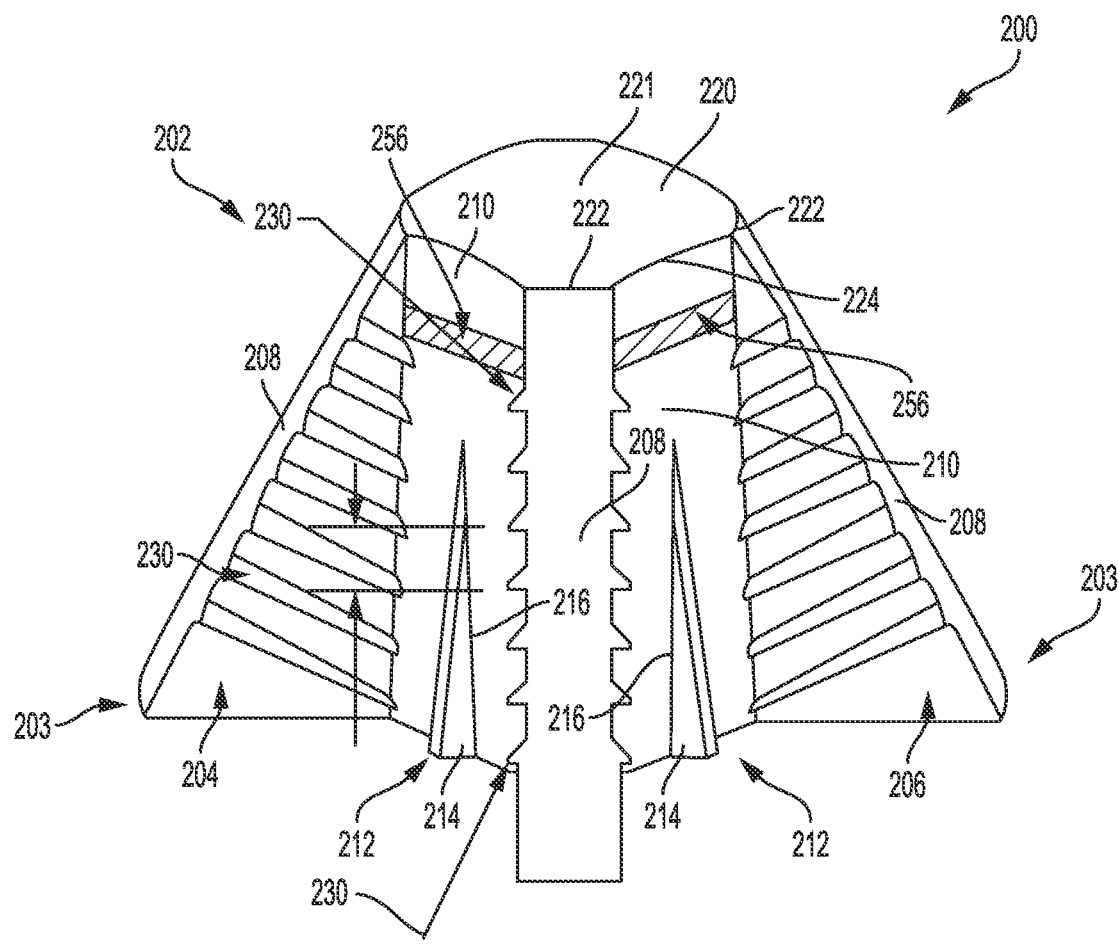
FIG. 9 is a perspective view of an example driver in accordance with disclosed embodiments.
Figure 11:
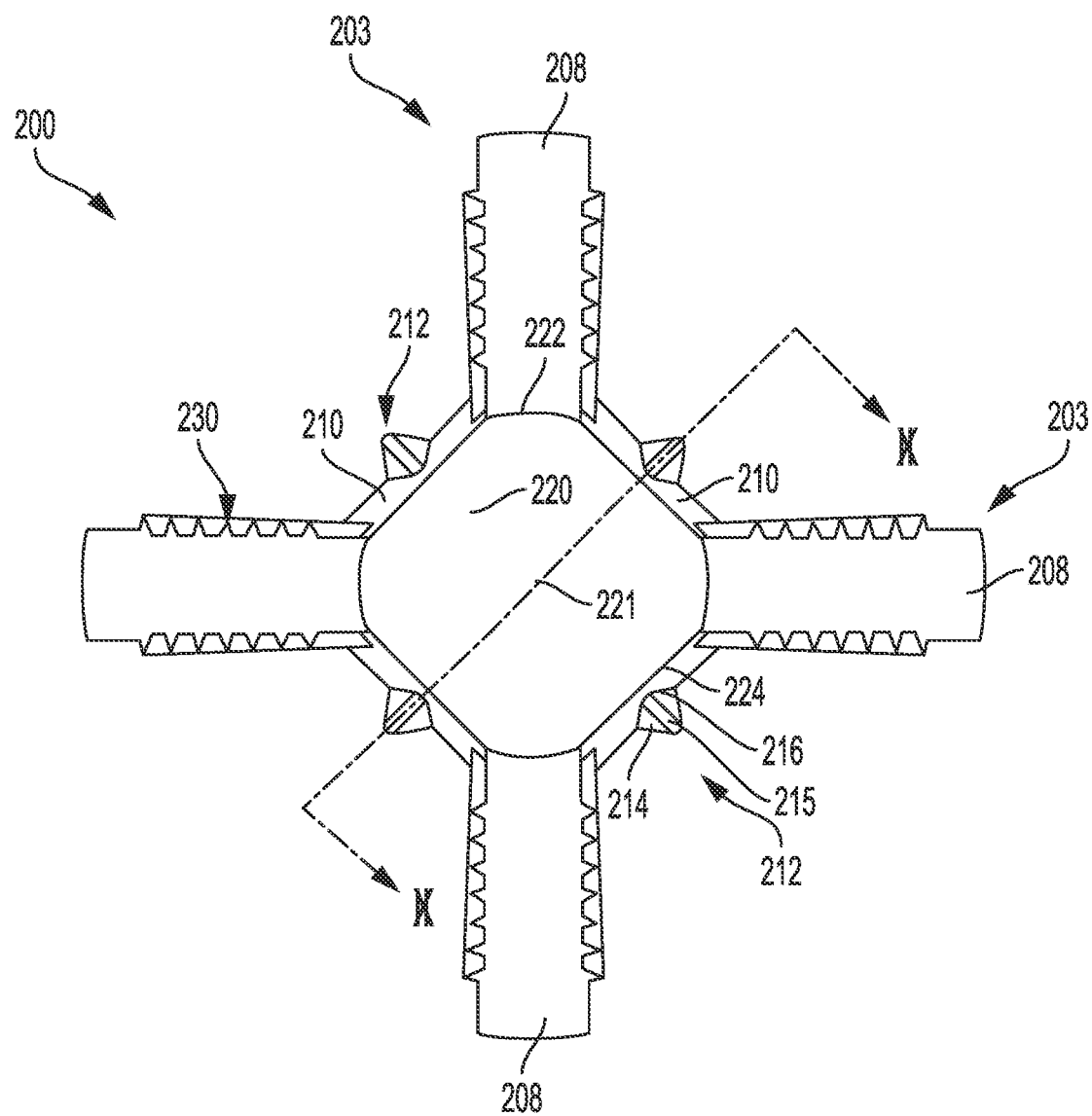
FIG. 11 is an end view of an example driver in accordance with disclosed embodiments.

In one example, the recess-engageable portion 202 includes more than one inner transition surfaces 208 having a stabilizing rib 212. For example, in one embodiment, diametrically opposed inner transition surfaces 210 each have stabilizing ribs 212. The recess-engageable portion 202 can include, for example, any number of pairs of diametrically opposed stabilizing ribs 212. As shown in FIGS. 9 and 11, the recess-engageable portion 202 includes two pairs of diametrically opposed stabilizing ribs 212, or in the alternative one, three, four, or more pairs for drivers with different configurations.

The stabilizing ribs 212, in one example, includes rib walls 214 connected together at rib apex 215 (FIG. 11). The rib walls 214 intersect the inner transition surfaces 210 at intersection lines 216. The angle between the groove walls may be any angle configured to provide the desired stability and also based on the size and configuration of the recess. In one example, the angle between the rib walls 214 is between about 60 degrees and about 80 degrees, or about 70 degrees for a PSD size 1-2 driver. In one example, the angle between the rib walls 214 is greater than the angle $\delta$ between groove wall forming portions 314 (and the corresponding formed recess). In one example having an angle between the rib walls 214 greater than the angle $\delta$ between groove wall forming portions 314 (or groove walls 114) promotes stability and surface contact between the driver bit rib and the recess groove when needed based on any imperfections of the primary square sticking feature, for example at the inner transition surfaces. Further, it helps eliminate unwanted rock of the driver bit within the recess back and forth.

The inner transition surfaces 210, in one example, are tapered inward toward the longitudinal axis of the fastener from the shank of the driver towards the end region 220/tip 221. The taper of the inner transition surfaces 210 establishes interference surfaces 256 (indicated in diagonal markings) for providing an interference fit with cooperating surfaces of the corresponding recess.

One or both of the installation or removal sidewalls 204, 206 may be provided, in one example, with torque ribs 230. The torque ribs 230 can be provided to reduce cam-out and other advantages disclosed within the '634 patents.

Figure 10:
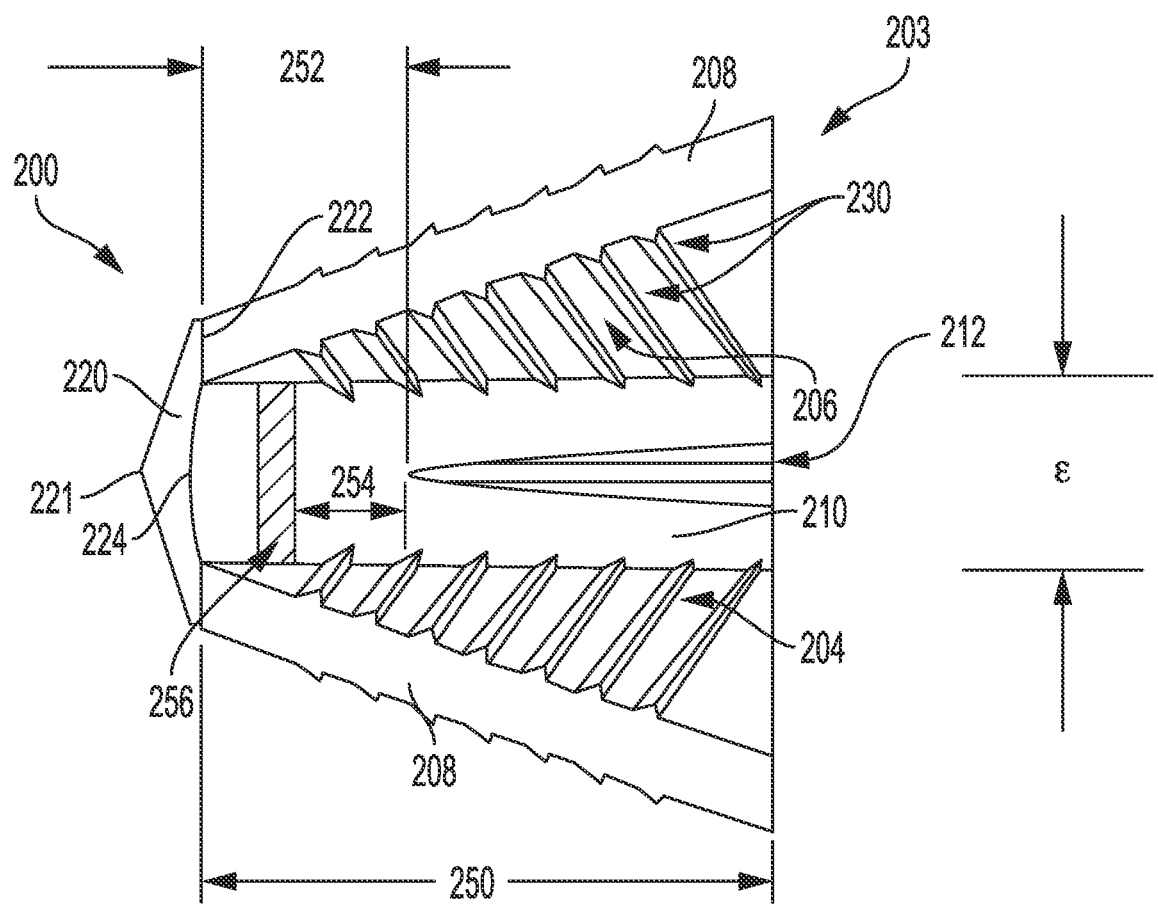
FIG. 10 is a side view of an example driver in accordance with disclosed embodiments.

With respect to FIG. 10, stabilizing ribs 212 begin a distance 252 from the end region outer transition edge 222 and continues to a distance 250 from the end region outer transition edge 222. In one example, the distance 250 may end at the upper limit of lobes 203, or in another example, continue past lobes 203. The edges of the inner transition surfaces 210, i.e., where the inner transition surfaces 210 meet the lobes 203 may form an angle c, which may also conform to a corresponding recess angle. In one example ε is about 1.5 degrees for PSD size 1-2 driver. In one particular example, distance 252 is greater than zero such that the groove 112 does not extend to the bottom region 120. In one particular example, stabilizing rib 212 has a rib clearance distance 254 greater than about zero from the top of the interference surface 256.

FIG. 11 shows an end view looking towards the tip 221 of driver 200 having four lobes 203 and four stabilizing ribs 212. From this view it can be seen that inner transition surfaces 210 are tapered inward toward the tip 221.

Figure 12:
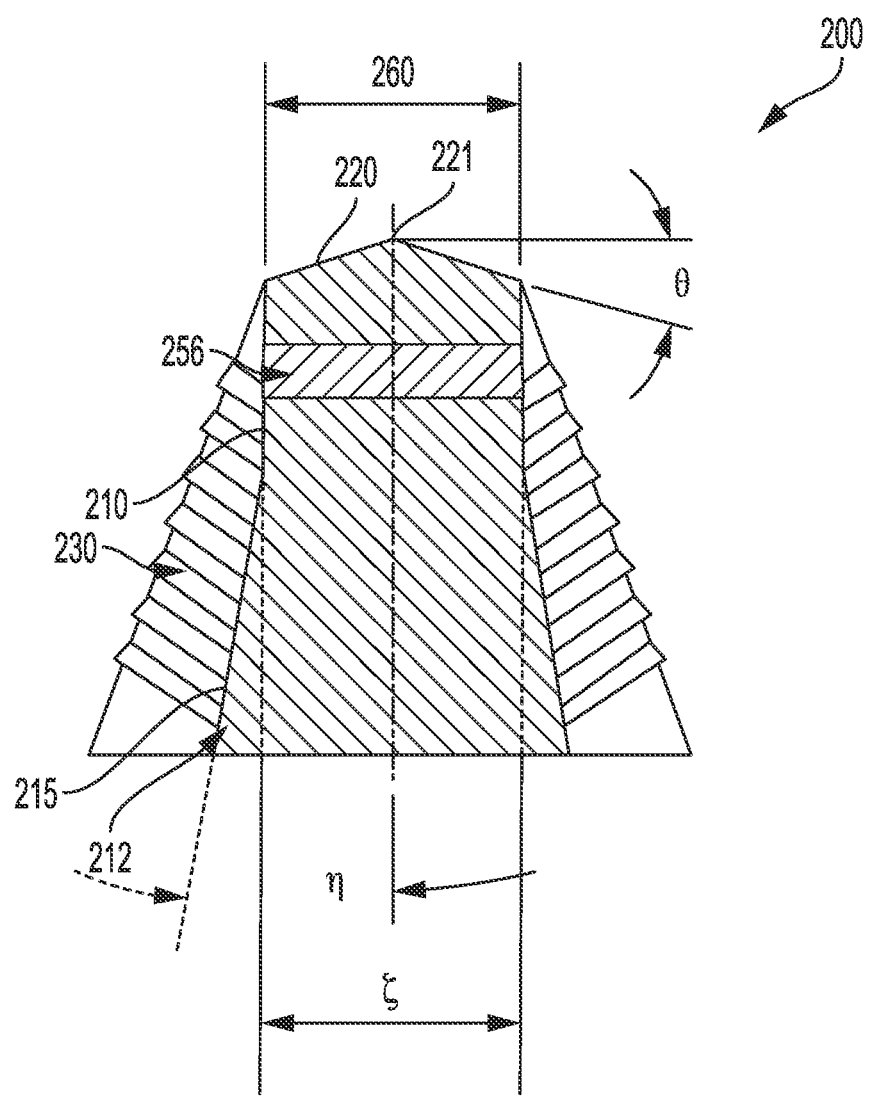
FIG. 12 is a cross section view taken along line XII-XII of FIG. 11.

FIG. 12 shows a cross section of FIG. 11. In one example, the distance 260 between the opposing inner transition surfaces 210 at the end region inner transition edge 224 conforms to a standard square driver size. In one example, distance 260 is between about 0.0889 inches and about 0.0879 inches, inclusive for a PSD 1-2 size driver. In one example, the inner transition surface, are tapered inward toward the longitudinal axis of the driver at a taper angle ζ with respect to the longitudinal axis of the driver 200. In one example the taper angle ζ is between about 4.5 degrees and about 5.5 degrees, inclusive. In addition, those fasteners/drivers disclosed that are, at least in part, defined by spiral segments, for example, the Stacy patents, the Dilling patents, and/or the '130 publication. The disclosures of these patents are incorporated herein by reference in each of their entireties. In one particular example, the taper angle ζ is larger than taper angle β of the associated recess, thereby creating, in one example, an interference fit in interference fit region 256. Other taper angles may also be appropriate in accordance with the design of the respective recess.

In one example, the stabilizing rib apex 215 is tapered inward toward the longitudinal axis of the driver 200 toward the tip 221 at a stabilizing rib apex taper angle η with respect to the longitudinal axis of the integral nib driver 200. In one example, the stabilizing rib apex taper angle η is between about 6 degrees and about 10 degrees, or between about 7.5 degrees and about 8.5 degrees, inclusive for a PSD 1-2 size driver. In one example, the stabilizing rib apex taper angle η is less than the taper angle γ of the corresponding recess groove 112 which can provide additional clearance between the stabilizing rib 212 and corresponding groove 112 when mated. Other taper angles may also be appropriate in accordance with the design of the respective recess.

Figure 13:
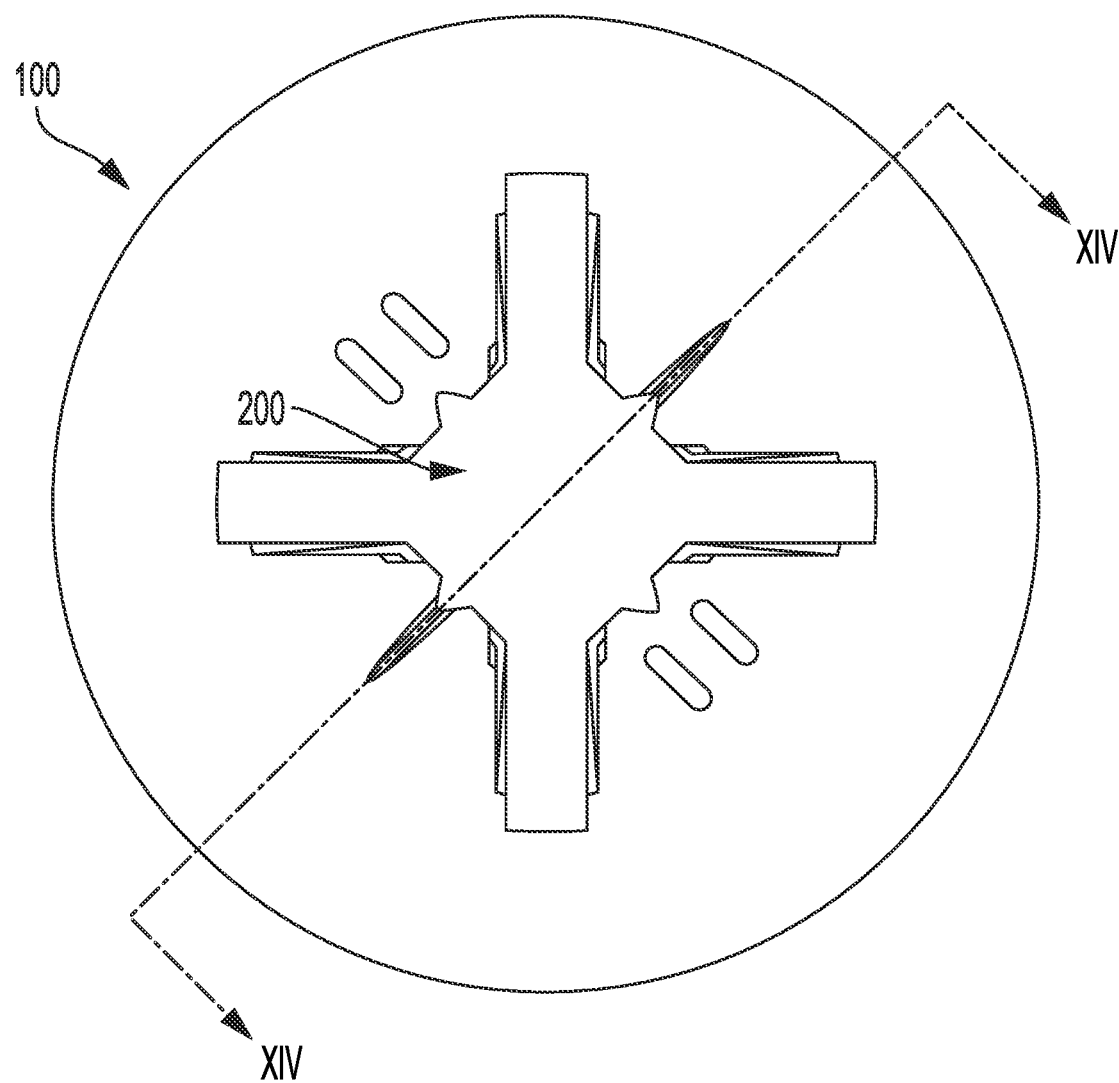
FIG. 13 is an end view of an example driver mated with an example recess in accordance with disclosed embodiments.

FIG. 13 shows a top view of an example fastener 100 with driver 200 inserted therein. The remaining portion of the driver including the shaft is not shown for clarity.

Figure 14:
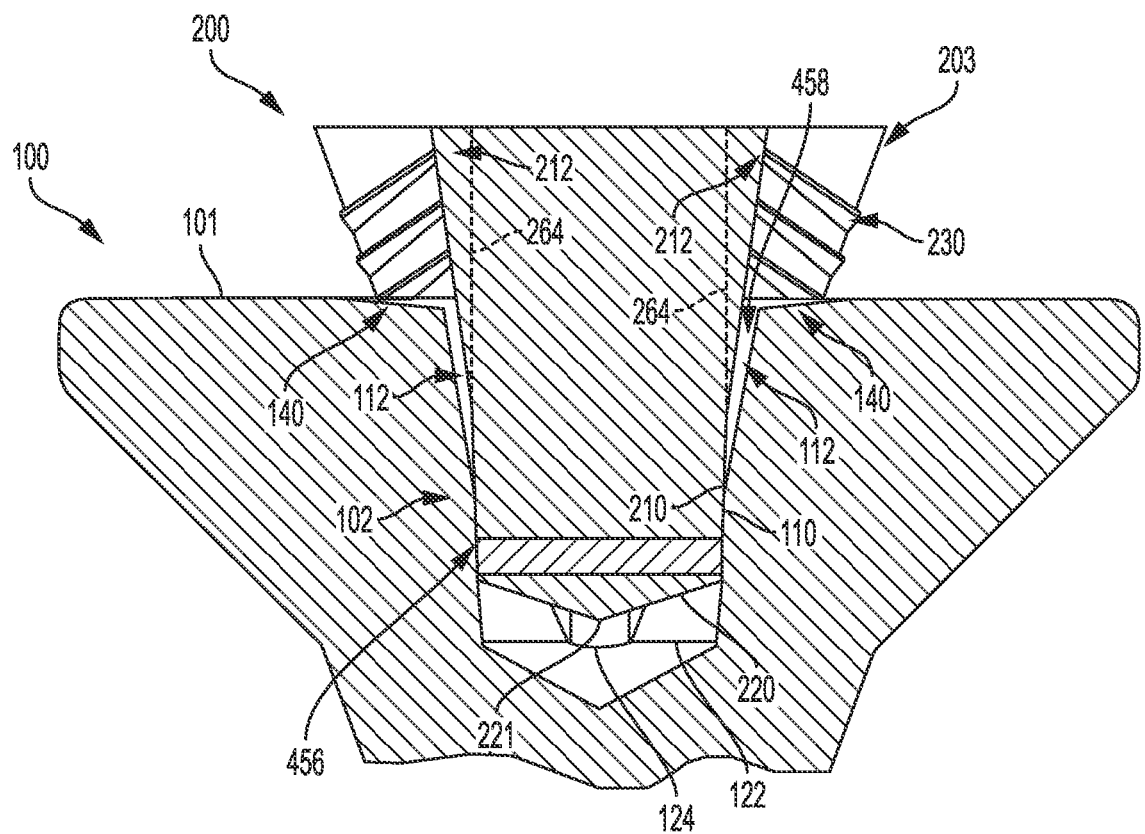
FIG. 14 is a cross section view taken along line XIV-XIV of FIG. 13.

FIG. 14 shows a cross section view of FIG. 13 showing driver 200 engaged within recess 102. Dashed lines 264 has been added to indicate the profile of the corresponding stabilizer ribs 212 outside of the dashed lines. The inner transition surfaces 110 and 210 in normal coaxial insertion between the driver 200 and fastener 100 establish an interference fit 456 preventing the driver tip 221 from bottoming out in the recess. The amount and degree of stick fit can be manipulated according to fastener and driver design requirements in accordance with this specification. Further, in normal coaxial insertion between the driver 200 and fastener 100, clearance 459 is present between the stabilizing rib 212 and groove 112. This clearance, in one example, may also be included in order to favor establishing a stick fit 456 over rib 212 to groove 212 contact.

However, if the driver 200 were to be rocked within the recess 102 or inserted at an angle with respect to the longitudinal axis of the recess 102, the stabilizing rib 212 would engage the corresponding groove 112 to provide stability. Further, the stabilizing ribs 212 and grooves 112 may also provide stability should the dimensions of the inner transition surfaces 210 or other driver dimensions be out of normal tolerances such that a desired stick fit 456 is not fully obtained.

Figure 15:
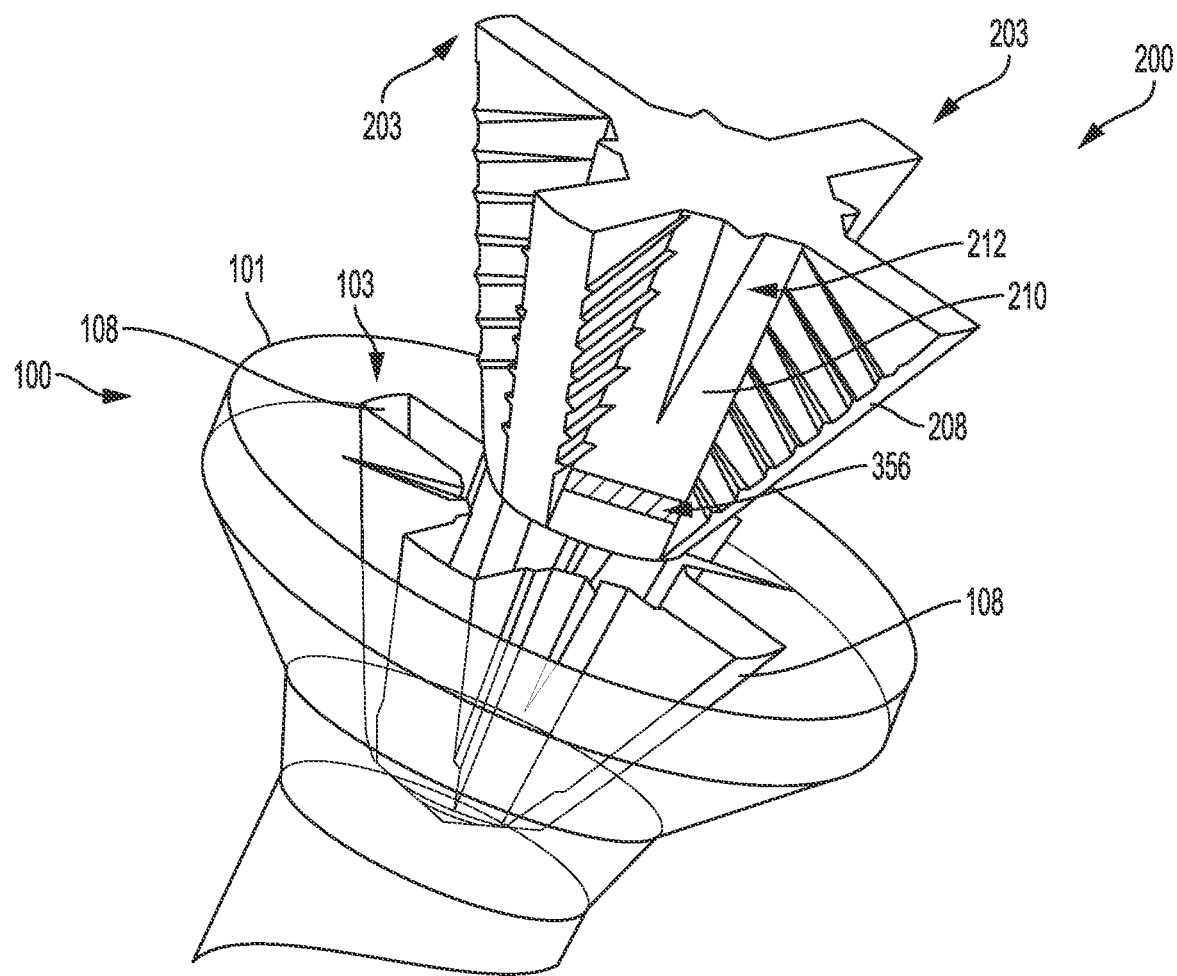
FIG. 15 is a perspective view of an example driver being mated with an example recess in accordance with disclosed embodiments.
Figure 16:
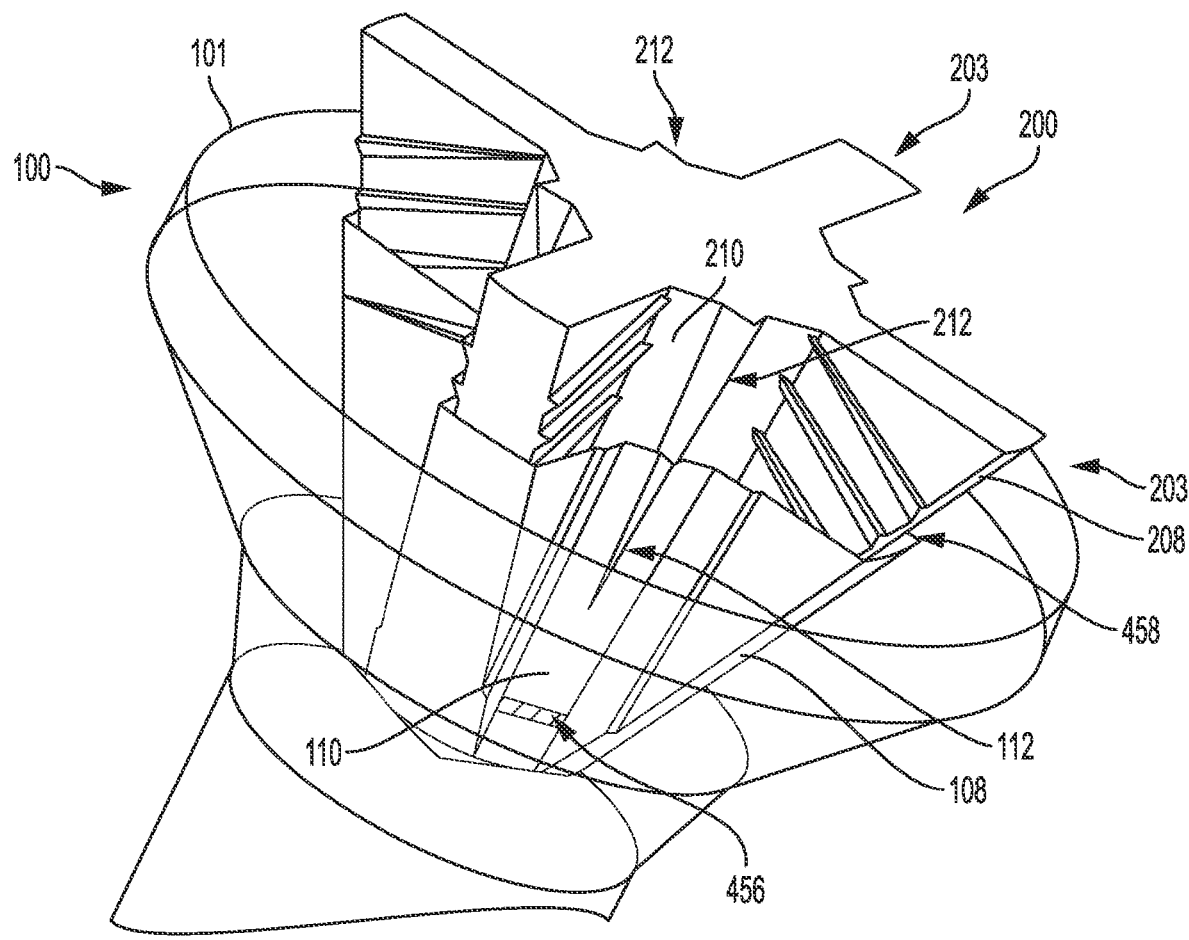
FIG. 16 is a perspective view of an example driver mated with an example recess in accordance with disclosed embodiments.

With continuing reference to FIGS. 15 and 16, in one example, the driver lobe 203 and recess wings 103 may be configured such that a clearance 458 (FIG. 16) is present between the outer transition surfaces 108, 208 of the recess and drivers, respectively. This clearance 458 (FIG. 16) may be included to further ensure a stick fit 456 is established between respective inner transition surfaces 110, 210 instead of bottoming the driver outer transition surfaces 208 to the recess outer transition surfaces 108. In one non-limiting example, clearance 458 may be about 0.0020 inches for a PSD 1-2 sized driver and corresponding recess. In one non-limiting example, clearance 458 in between about 0.002 inches and about 0.010 inches, inclusive for a PSD 0-1, 1-2, 2-2 and 3-3 sized drivers.

Increasing the stability of the driver, i.e., the driver axis is more in line with the recess axis, has a number of non-limiting advantages. For example, by maintaining stability of the driver within the recess, an improved stick fit 456 may occur which may increase the speed of application fasteners to the work piece. Further the lobes 203 may have improved engagement with the wings 103 which will decrease cam-out and drive/recess damage.

Figure 17:
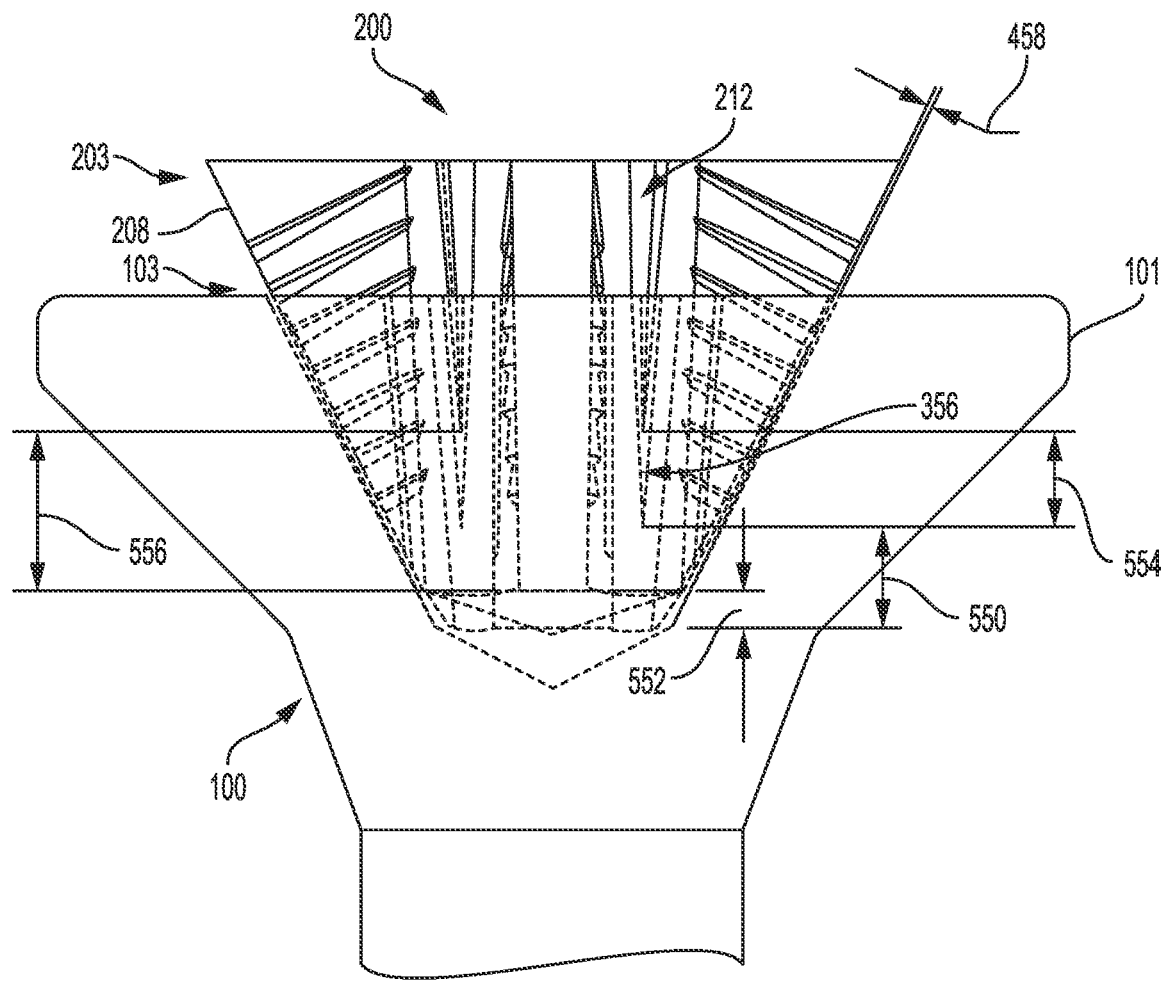
FIG. 17 is a side view of an example driver mated with an example recess in accordance with disclosed embodiments.

FIG. 17 shows and shows an example driver 200 engaged with example fastener 100, as well as example, non-limiting dimensions in accompanying table 2.

TABLE 2

| | (inches) | | | |
|---|---|---|---|---|
| DRIVE SIZE | 550 | 552 | 554 | 556 |
| PSD 0-1 | .049 | .033 | .020 | .036 |
| PSD 1-2 | .040 | .015 | .035 | .060 |
| PSD 2-2 | .062 | .037 | .035 | .060 |
| PSD 3-3 | .041 | .020 | .045 | .066 |

Dimension Formulas: (554 + 550) − 552 = 556

Figure 18:
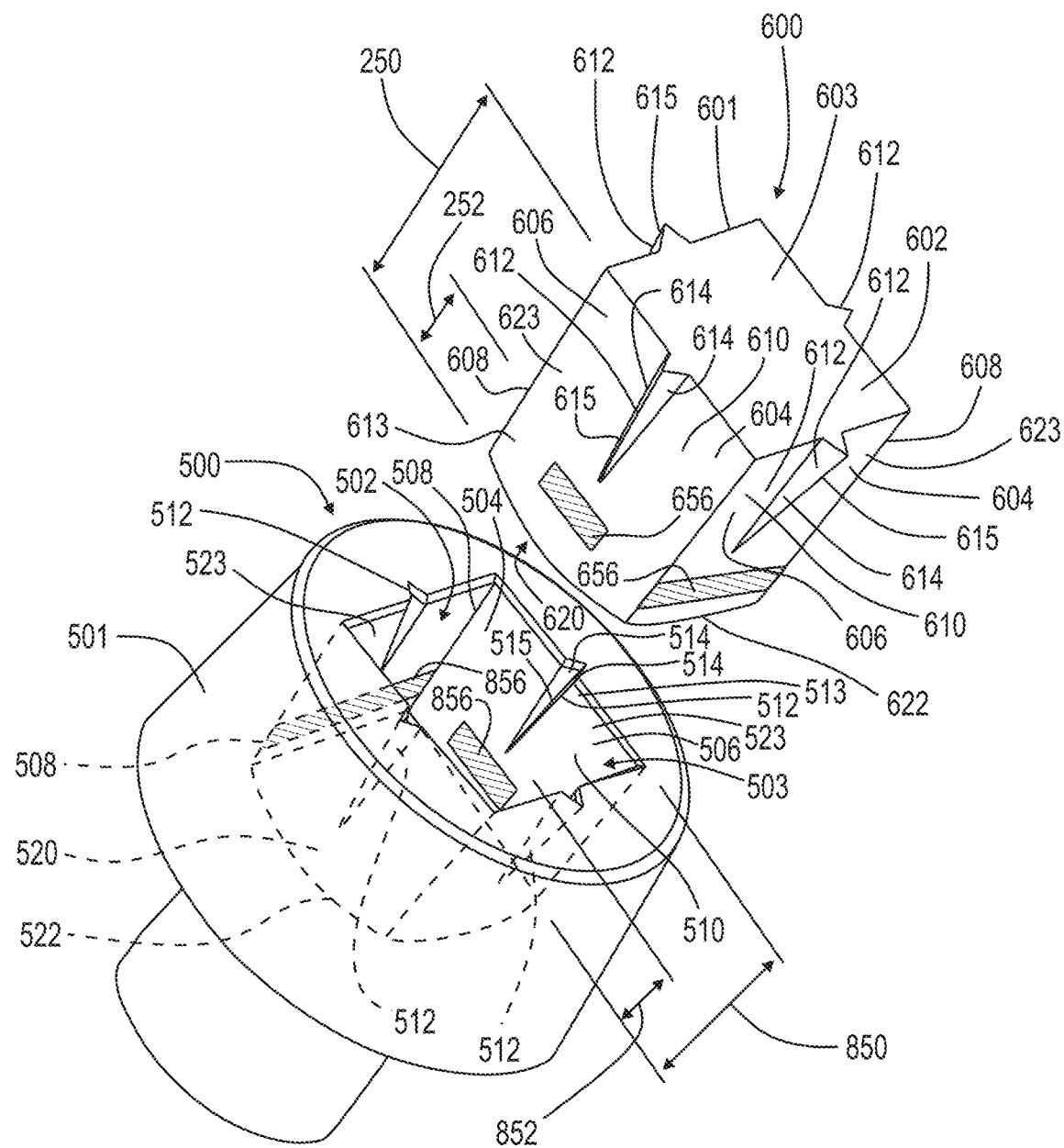
FIG. 18 is a perspective view of an example of a recess and driver in accordance with disclosed embodiments.

FIG. 18 shows a view of an example fastener 500 and driver 600 having a polygonal shape. The fastener 500 has a driver-engageable recess 502 formed in a head 501. The driver-engageable recess 502 includes a central recess core 503, a bottom region 520 and a plurality of recess surfaces 513 including four sidewalls 523 extending from a top of the recess and connected to the bottom region 520 and forming a bottom region transition edge 522 at the intersection of the bottom region 520 and the recess surfaces 523. The recess 502 is of polygonal form that may be defined as generally square in plan. The recess sidewalls 523 include an installation surface 504, and a removal surface 506, which are separated from each other by a non-driving transition surface 510. Adjacent sidewalls 523 meet at the recess corners 508. The recess driving surfaces 504 and 506 are referred to herein as installation surfaces 504 and removal surfaces 506, respectfully, assuming a right-handed fastener thread.

At least one of the sidewalls 523 includes a stabilizing groove 512. The stabilizing groove 512 extends radially outward from the sidewall 523 and extends axially from a first distance 852 from the bottom region transition edge 522 to a second distance 850 from the bottom region transition edge 522. In the illustrated example, the first distance 852 is nonzero, and the second distance 850 is to the top of the recess. The stabilizing groove 512, in one example, includes groove walls 514 that are connected together at a groove apex 515. The angle between the stabilizing groove walls may be any angle configured to provide the desired stability and also based on the size and configuration of the recess 502. In one example, the groove apex 515 is tapered at an angle of about 10.4 degrees from the longitudinal axis of the fastener 500. There is an angle of between about 40 degrees and about 60 degrees, inclusive, between the first and second groove walls 514. The stabilizing groove apex 515 meets the recess surface 510 at the first distance 852 from the bottom region transition edge 522.

The recess sidewall surface 523 includes a recess interference surface 856 defining a design recess interference region located between the groove 512 and the recess bottom region 520. The interference surface 856 may extend laterally partially or all the way between the recess corners 508. Note that some, but not all, hidden features of the recess 502 are shown in phantom lines, and that, for clarity of FIG. 18, some of the hidden recess interference surfaces are not shown in phantom lines. In one example, at least one of the recess surfaces 523 includes an interference surface 856 having a top defined by a design recess interference region and a distance from the top to the bottom region transition edge 522 is less than the first distance 852 to the groove 512.

The driver 600 includes a shank portion 601 and a recess-engaging portion 602 formed at an end of the shank portion 601. The recess-engaging portion 602 includes a driver central driver core 603 having an end region 620 and a plurality of driver surfaces 613 connected to the end region 620 and forming an end region transition edge 622 at the intersection with the driver end region 620. A driver central core 603 and a plurality of driver surfaces 613 form four sidewalls 623. The driver 600 is of polygonal form that may be defined as generally square in plan. In other embodiments, polygon forms for the recess and driver may be generally triangular, pentagonal, hexagonal (FIG. 19), or other shapes. The driver sidewalls 623 include a driving installation surface 604, and a driving removal surface 606, which are separated from each other by a non-driving transition surface 610. Adjacent sidewalls 623 meet at the corners 608. The driver surfaces 604 and 606 are referred to herein as installation surfaces 604 and removal surfaces 606, respectfully, assuming a right-handed fastener thread.

At least one of the sidewalls 623 includes a stabilizing rib 612. The stabilizing rib 612 extends radially outward from the sidewall 623 and the driver central core 603. The stabilizing rib 612, in one example, includes rib walls 614 that are connected together at a rib apex 615. The angle between the stabilizing rib walls may be any angle configured to provide the desired stability and also based on the size and configuration of the driver 600. In one example, there is an angle of between 60 degrees and 80 degrees, inclusive, between the first and second rib walls.

The stabilizing rib 612 extends from a first distance 652 from end region transition edge 622 to a second distance 650 from the end region transition edge 622. In one example, the first distance 652 is nonzero. The driver surface 623 includes a driver interference surface 656 defining a design driver interference region located between the stabilizing rib 612 and the driver end region 620. The interference surface 656 may extend partially or all the way between the driver corners 608. In one example, at least one of the driver surfaces 623 includes an interference surface 656 having a top defined by a design driver interference region and a distance from the top to the end region transition edge 622 is less than the first distance 652 to the rib 612.

The stabilizing groove(s) 512 interact with corresponding stabilizing rib(s) 612 to stabilize the driver 600 within the recess 502 and to minimize rocking of the driver 600. The stabilizing rib 612 includes rib walls 614 that are connected together at a rib apex 615. Each stabilizing rib 612 extends from a driver side wall 623. The driver side walls 623 selectively engage the sidewalls 523 of fastener 500 to either install or remove the fastener.

In normal coaxial insertion between the driver 600 and the fastener 500, the recess interference surfaces and the driver interference surfaces establish an interference fit located between the groove 512 and the recess bottom region 520 and between the stabilizing rib 612 and the driver end region transition edge 622 preventing the driver end region 620 from bottoming out in the recess bottom region 520. In one example, in normal coaxial insertion between the driver and the fastener, a clearance is present between the stabilizing rib 612 and the groove 512.

The recess driving surfaces 504, 506 are nearer the edges 508 of the recess 502, and the non-driving recess surfaces 510 are between the recess driving surfaces 504, 506. The driver driving surfaces 604, 606 are nearer the edges 608 of the driver 600, and the driver non-driving surfaces 610 are between the driver driving surfaces 604, 606. The extent of the driving and non-driving surfaces depends on the recess and driver sizes and configuration.

In the illustrated example, the groove 512 includes first and second groove walls 514, the first and second groove walls meeting at a groove apex 515, the groove 515 apex being tapered radially inward as the groove 512 extends in a direction from the top of the recess 502 toward the bottom region 520. The stabilizing rib 612 includes first and second rib walls 614, the first and second rib walls 614 meeting at a stabilizing rib apex 615, the rib apex 615 being tapered radially inward as the stabilizer rib 612 extends toward the end region 620. The stabilizing groove apex 515 is tapered at a groove apex taper angle with respect to a longitudinal axis of the fastener 500 and the stabilizing rib apex 615 is tapered at a stabilizing apex taper angle with respect to a longitudinal axis of the driver 600, the groove apex taper angle being larger than the stabilizing rib apex taper angle.

In the illustrated embodiment, the recess grooved surfaces 510 and the driver ribbed surfaces 610 are non-driving surfaces. The driver ribbed surfaces 610 are tapered at an angle with respect to the longitudinal axis of the driver 600 and the recess grooved surfaces 510 are tapered at an angle with respect to the longitudinal axis of the recess 502. The driver ribbed surface 610 taper angle is less than the recess groove surface 510 taper angle, to form the interference surfaces 856 and 656.

Figure 19:
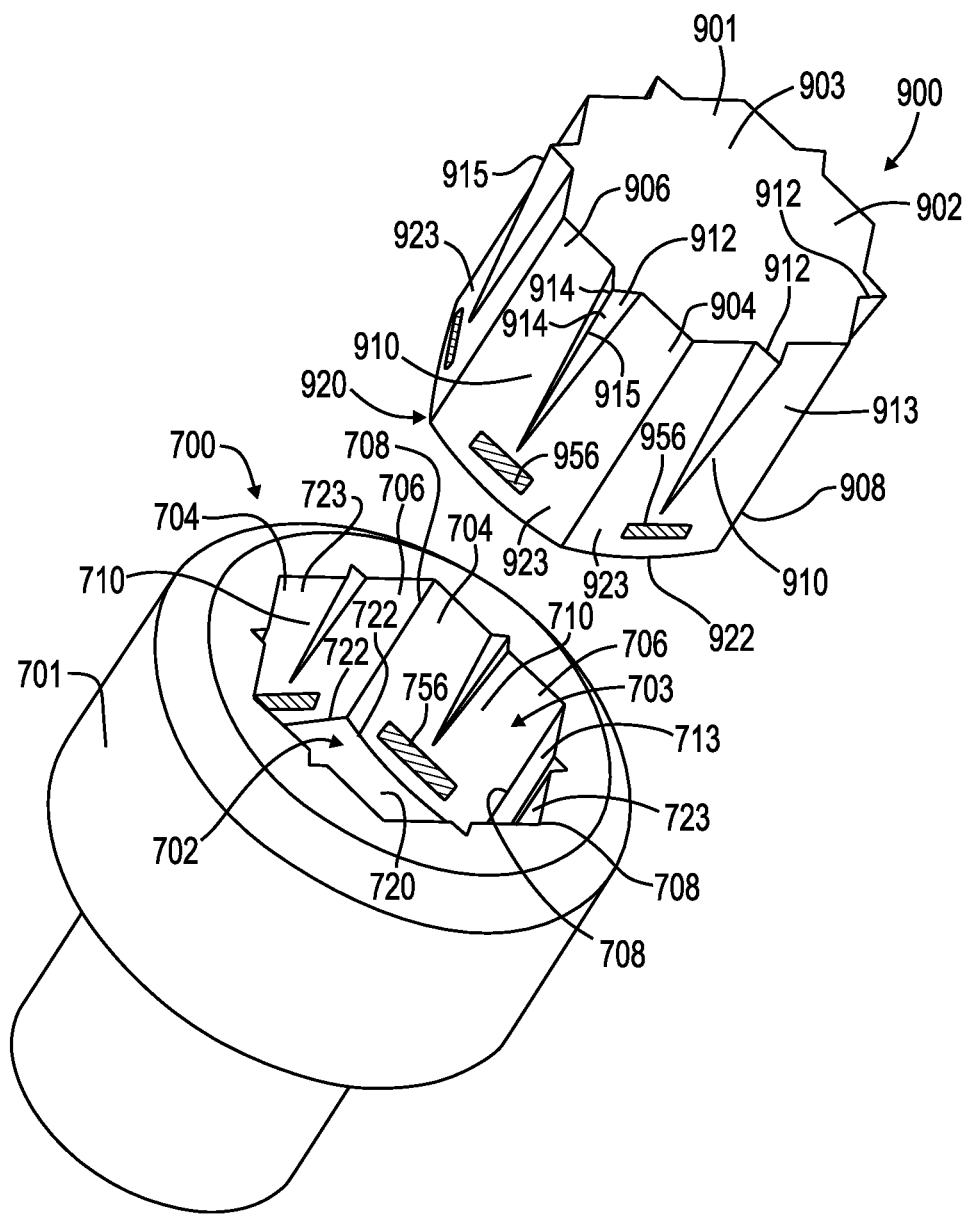
FIG. 19 is a perspective view of an example of another recess and driver in accordance with disclosed embodiments.

FIG. 19 shows a view of an example fastener 700 and driver 900 having a polygonal shape. The features of the fastener 700 and the driver 900 are similar to the fastener 500 and the driver 600 of FIG. 18, except that the recess of the fastener 700 and the driver 900 have a polygonal shape in the form of a hexagon, where the recess of the fastener 500 and the driver 600 have a polygonal shape in the form of a square.

The fastener 700 has a driver-engageable recess 702 formed in head 701. The driver-engageable recess 702 includes a central recess core 703, a bottom region 720 and a plurality of recess surfaces 713 including four sidewalls 723 extending from a top of the recess and connected to the bottom region 720 and forming a bottom region transition edge 722 at the intersection of the bottom region 720 and the recess surfaces 723. The recess 702 is of polygonal form that may be defined as generally hexagonal in plan. The recess sidewalls 723 include an installation surface 704, and a removal surface 706, which are separated from each other by a non-driving transition surface 710. Adjacent sidewalls 723 meet at the recess corners 708. The recess driving surfaces 704 and 706 are referred to herein as installation surfaces 704 and removal surfaces 706, respectfully, assuming a right-handed fastener thread.

At least one of the sidewalls 723 includes a stabilizing groove 712. The stabilizing groove 712 extends radially outward from the sidewall 723 and extends axially from a first distance from the bottom region transition edge 722 to a second distance from the bottom region transition edge 722. In the illustrated example, the first distance is nonzero, and the second distance is to the top of the recess. The stabilizing groove 712, in one example, includes groove walls 714 that are connected together at a groove apex 715. The angle between the stabilizing groove walls may be any angle configured to provide the desired stability and also based on the size and configuration of the recess 702.

The recess sidewall surface 723 includes a recess interference surface 756 defining a design recess interference region located between the groove 712 and the recess bottom region 520. The interference surface 756 may extend laterally partially or all the way between the recess corners 508. Note that the hidden features of the recess 702 are, for clarity of FIG. 19, not shown in phantom lines.

The driver 900 includes a shank portion 901 and a recess-engaging portion 902 formed at an end of the shank portion 901. The recess-engaging portion 902 includes a driver central driver core 903 having an end region 920 and a plurality of driver surfaces 913 connected to the end region 920 and forming an end region transition edge 922 at the intersection with the driver end region 920. The driver central core 903 and a plurality of driver surfaces 913 form six sidewalls 923. The driver 900 is of polygonal form that may be defined as generally hexagonal in plan. The driver sidewalls 923 include a driving installation surface 904, and a driving removal surface 906, which are separated from each other by a non-driving transition surface 910. Adjacent sidewalls 923 meet at the corners 908. The driver surfaces 904 and 906 are referred to herein as installation surfaces 904 and removal surfaces 906, respectfully, assuming a right-handed fastener thread.

At least one of the sidewalls 923 includes a stabilizing rib 912. The stabilizing rib 912 extends radially outward from the sidewall 923 and the driver central core 903. The stabilizing rib 912, in one example, includes rib walls 914 that are connected together at a rib apex 915. The angle between the stabilizing rib walls may be any angle configured to provide the desired stability and also based on the size and configuration of the driver 900.

The stabilizing rib 912 extends from a first distance from end region transition edge 922 to a second distance from the end region transition edge 922. In one example, the first distance is nonzero. The driver surface 923 includes a driver interference surface 956 defining a design driver interference region located between the stabilizing rib 912 and the driver end region 920. The interference surface 956 may extend partially or all the way between the driver corners 908.

The stabilizing groove(s) 912 interact with corresponding stabilizing rib(s) 712 to stabilize the driver 900 within the recess 702 and to minimize rocking of the driver 900. The driver side walls 923 selectively engage the sidewalls 723 of fastener 700 to either install or remove the fastener.

In normal coaxial insertion between the driver 900 and the fastener 700, the recess interference surfaces and the driver interference surfaces establish an interference fit located between the groove 712 and the recess bottom region 720 and between the stabilizing rib 912 and the driver end region transition edge 922 preventing the driver end region 920 from bottoming out in the recess bottom region 720. In one example, in normal coaxial insertion between the driver and the fastener, a clearance is present between the stabilizing rib 912 and the groove 712.

In this manner a new and unique fasteners, drivers, punches, and fastener systems are presented that provides an improvement in stability characteristics with respect to the driver recess engagement and also improve the overall performance of the fastener system.

It should be understood that the above description is only illustrative of the invention. Various alternatives and modifications can be devised by those skilled in the art without departing from the invention. Accordingly, the present invention is intended to embrace all such alternatives, modifications and variances.

What is claimed as new desired to be protected by Letters Patent of the United States is:

1. A fastener, comprising:
    a head configured to engage a driver;
    a central recess core positioned in the head and having a recess bottom region;
    four recess surfaces defining four recess corners, the four recess surfaces extending from a top of the central recess core and connected to the recess bottom region and forming a bottom region transition edge at an intersection of the recess bottom region and the four recess surfaces, each pair of adjacent ones of the four recess surfaces meeting at one of the four recess corners such that the four recess surfaces conform to a shape of a square, the square having four corners coinciding with the four recess corners; and
    a groove in each of the four recess surfaces, each groove extending in a radially outward direction from a corresponding one of the four recess surfaces, each groove extending from a first distance from the bottom region transition edge to a second distance from the bottom region transition edge, the first distance being nonzero, the second distance being more than twice the first distance, wherein each of the four recess surfaces is flat from a bottom of the groove to the transition edge, and includes therebetween a recess interference surface, and wherein, for each of the four recess surfaces, the recess interference surface defines a design recess interference region located entirely below the groove and entirely above the recess bottom region.

2. The fastener of claim 1, further comprising, for each of the four recess surfaces, a clearance distance between a top of the design recess interference region and the groove.

3. The fastener of claim 1, wherein, for each of the four recess surfaces, the recess interference surface extends laterally all the way between two of the four recess corners.

4. The fastener of claim 1, wherein, for each of the four recess surfaces, the recess interference surface extends laterally partially, but not all the way between, two of the four recess corners.

5. The fastener of claim 1, wherein, for each of the four recess surfaces, the groove includes two groove walls connected to each other at a groove apex.

6. The fastener of claim 5, wherein, for each of the four recess surfaces, the two groove walls form an angle of between 40 degrees and 60 degrees, inclusive.

7. The fastener of claim 6, wherein, for each of the four recess surfaces, the groove apex is tapered at a taper angle of 10.4 degrees from a longitudinal axis of the fastener.

8. A system, comprising:
the fastener of claim 1; and
a driver.

9. The system of claim 8, wherein the driver includes:
a shank portion;
a recess-engaging portion formed at an end of the shank portion, the recess-engaging portion including:
a central driver core having an end region;
four driver surfaces defining four driver corners, the four driver surfaces being connected to the end region and forming an end region transition edge at another intersection of the end region and the four driver surfaces, each pair of adjacent ones of the driver surfaces meeting at one of the four driver corners such that the four driver surfaces conform to a shape of another square, the another square having another four corners coinciding with the four driver corners.

10. The system of claim 9, wherein the driver further comprises:
a rib on each of the four driver surfaces, each rib extending in a radially outward direction from a corresponding one of the four driver surfaces, each rib extending from a third distance from the end region transition edge to a fourth distance from the end region transition edge, the third distance being nonzero,
wherein each of the four driver surfaces includes a driver interference surface, and wherein, for each of the four driver surfaces, the driver interference surface defines a design driver interference region located entirely below the rib and entirely above the end region.

11. The system of claim 10, wherein, for each of the four driver surfaces, the rib includes two rib walls connected to each other at a rib apex.

12. The system of claim 11, wherein, for each of the four driver surfaces, the two rib walls form an angle of between 60 degrees and 80 degrees, inclusive.

13. The system of claim 12,
wherein, for each of the four recess surfaces, the groove includes two groove walls connected to each other at a groove apex;
wherein, for each of the four recess surfaces, the two groove walls form another angle of between 40 degrees and 60 degrees, inclusive;
wherein, for each of the four recess surfaces, the groove apex is tapered at a first angle from a longitudinal axis of the fastener;
wherein, for each of the four driver surfaces, the rib apex is tapered at a second angle from another longitudinal axis of the driver; and
wherein the first angle is larger than the second angle.

* * * * *